(12) United States Patent
Kim et al.

(10) Patent No.: US 12,260,141 B2
(45) Date of Patent: Mar. 25, 2025

(54) DISPLAY DEVICE AND OPERATING METHOD THEREFOR

(71) Applicant: SAMSUNG ELECTRONICS CO., LTD., Suwon-si (KR)

(72) Inventors: Euijun Kim, Suwon-si (KR); Daewung Kim, Suwon-si (KR); Jiyeon Ma, Suwon-si (KR); Donghun Shin, Suwon-si (KR); Sungjun Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/220,620

(22) Filed: Jul. 11, 2023

(65) Prior Publication Data

US 2023/0350624 A1 Nov. 2, 2023

Related U.S. Application Data

(63) Continuation of application No. PCT/KR2021/001369, filed on Feb. 2, 2021.

(30) Foreign Application Priority Data

Jan. 11, 2021 (KR) .................. 10-2021-0003564

(51) Int. Cl.
*G06F 3/14* (2006.01)
(52) U.S. Cl.
CPC .................................. *G06F 3/14* (2013.01)

(58) Field of Classification Search
CPC ........... G06F 16/41; G06F 16/44; G06F 16/45
See application file for complete search history.

(56) References Cited

U.S. PATENT DOCUMENTS 11,709,879 B2 * 7/2023 Kerkes .................... H04L 43/04
709/224
2013/0076983 A1 3/2013 Hong et al.
(Continued)

FOREIGN PATENT DOCUMENTS

| KR | 10-1092009 B1 | 12/2011 |
| KR | 10-1170403 B1 | 8/2012 |

(Continued)

OTHER PUBLICATIONS

International Search Report (PCT/ISA/210) and Written Opinion (PCT/ISA/237) issued by the International Searching Authority on Sep. 28, 2021 in International Application No. PCT/KR2021/001369.

(Continued)

*Primary Examiner* — Van N Chow
(74) *Attorney, Agent, or Firm* — Sughrue Mion, PLLC

(57) ABSTRACT

A display apparatus includes: a display; a communicator; a memory configured to store at least one instruction; and a processor operatively connected to the memory and configured to execute the at least one instruction to: control the communicator to connect at least one source device and at least one input device to the display apparatus; control the display to display an image received from a first source (Continued)

device among the at least one source device; and based on input data being received from a first input device among the at least one input device, control the communicator to control the first source device based on the input data.

14 Claims, 26 Drawing Sheets

(56) References Cited

U.S. PATENT DOCUMENTS

| | | | |
|---|---|---|---|
| 2013/0232437 A1 | 9/2013 | Kim | |
| 2014/0059169 A1* | 2/2014 | Ko | G06F 3/04845 |
| | | | 709/217 |
| 2014/0364208 A1* | 12/2014 | Perry | A63F 13/355 |
| | | | 463/31 |
| 2015/0009096 A1* | 1/2015 | Lee | G06F 1/163 |
| | | | 345/2.2 |
| 2015/0020013 A1 | 1/2015 | Kim et al. | |
| 2015/0301777 A1 | 10/2015 | Jang | |
| 2015/0339244 A1 | 11/2015 | Lee et al. | |
| 2017/0235461 A1 | 8/2017 | Oh et al. | |
| 2018/0011578 A1 | 1/2018 | Choi et al. | |
| 2018/0240331 A1 | 8/2018 | Lee et al. | |
| 2019/0116334 A1* | 4/2019 | Lim | H04N 21/4108 |
| 2019/0294400 A1 | 9/2019 | Lee | |
| 2019/0351320 A1 | 11/2019 | Koizumi et al. | |
| 2019/0387268 A1 | 12/2019 | Adusumilli | |
| 2021/0129012 A1 | 5/2021 | Perry | |
| 2021/0201053 A1* | 7/2021 | Gou | G06V 10/945 |
| 2021/0266443 A1* | 8/2021 | Yi | H04N 23/90 |
| 2022/0269362 A1 | 8/2022 | Lee et al. | |
| 2022/0296323 A1* | 9/2022 | Waldo | F16M 11/2092 |
| 2022/0347584 A1 | 11/2022 | Zimring et al. | |
| 2023/0079485 A1* | 3/2023 | Kim | G09F 9/335 |
| | | | 345/156 |

FOREIGN PATENT DOCUMENTS

| | | |
|---|---|---|
| KR | 10-2015-0007760 A | 1/2015 |
| KR | 10-1790429 B1 | 10/2017 |
| KR | 10-2018-0005055 A | 1/2018 |
| KR | 10-1911957 B1 | 10/2018 |
| KR | 10-1925027 B1 | 12/2018 |
| KR | 10-2019-0000328 A | 1/2019 |
| KR | 10-2019-0041690 A | 4/2019 |
| KR | 10-2019-0112406 A | 10/2019 |
| KR | 10-2019-0121407 A | 10/2019 |
| KR | 10-2102246 B1 | 4/2020 |
| KR | 10-2120843 B1 | 6/2020 |
| KR | 10-2020-0135866 A | 12/2020 |
| KR | 10-2393917 B1 | 5/2022 |

OTHER PUBLICATIONS

Communication dated Apr. 29, 2024, issued by the European Patent Office in counterpart European Application No. 21917811.8.

* cited by examiner

FIG. 5A
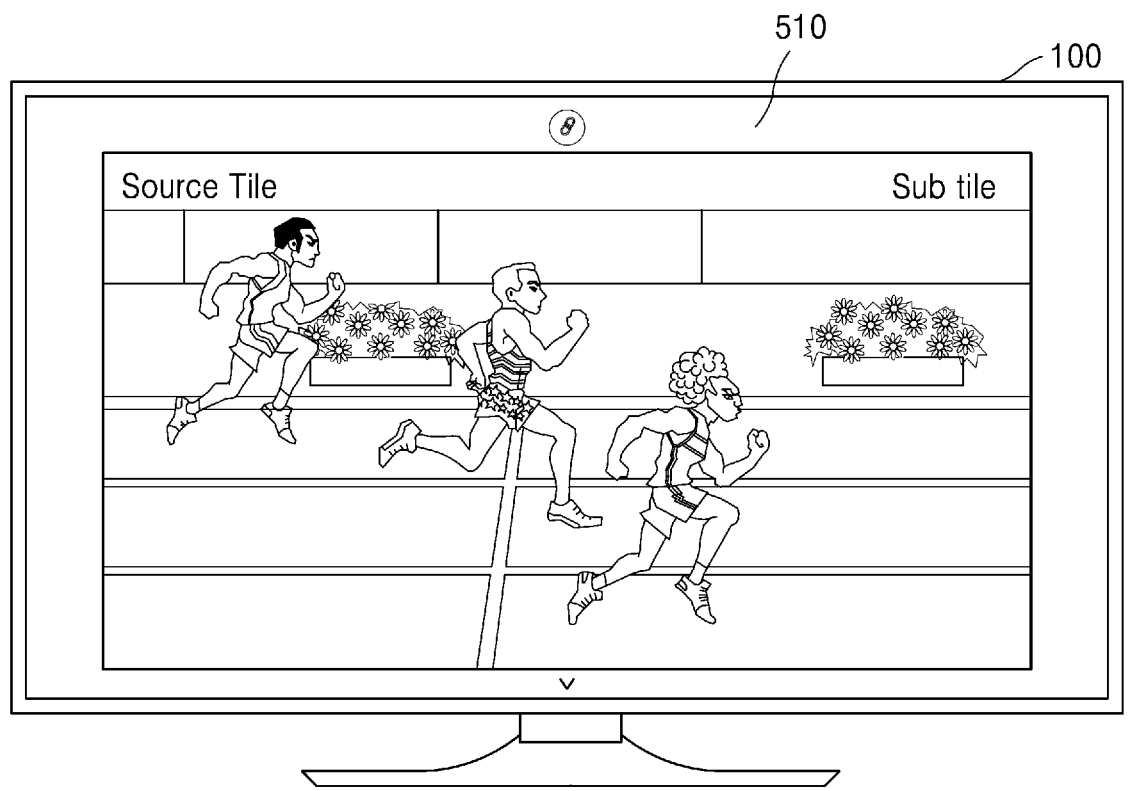
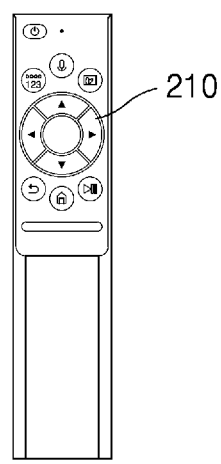

FIG. 5B
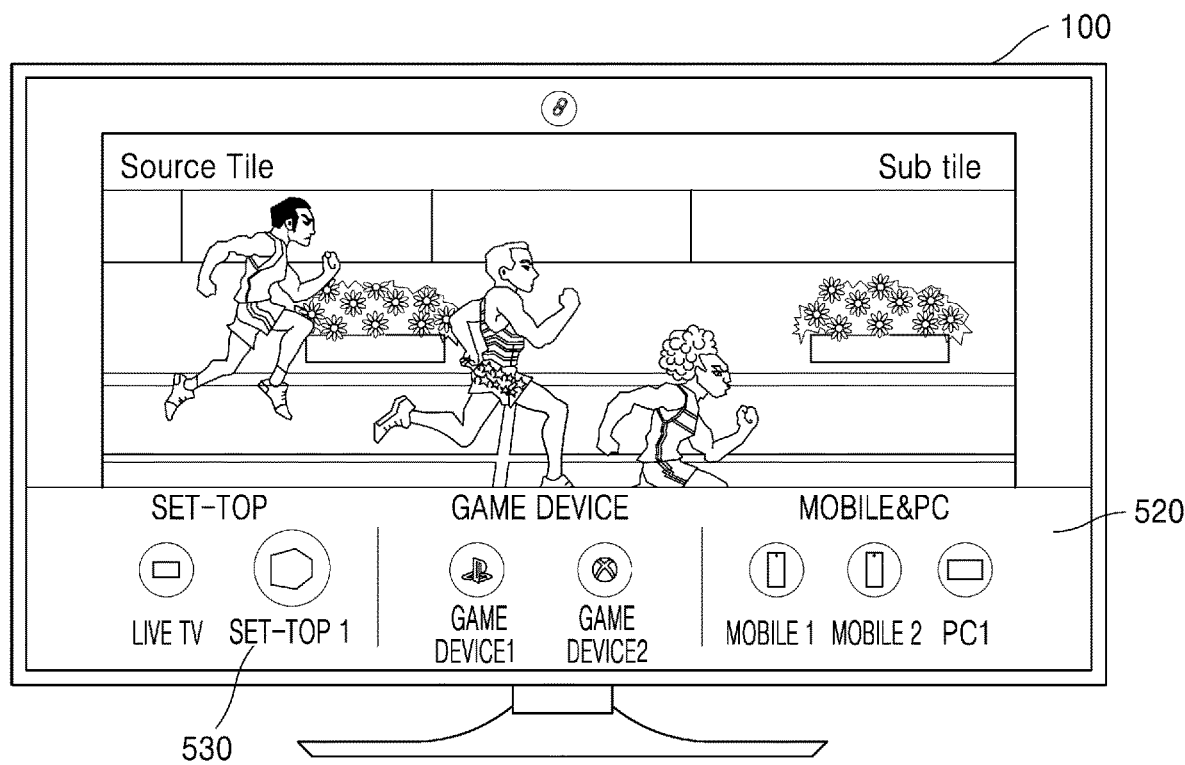
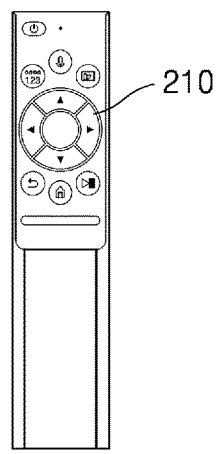

FIG. 5C
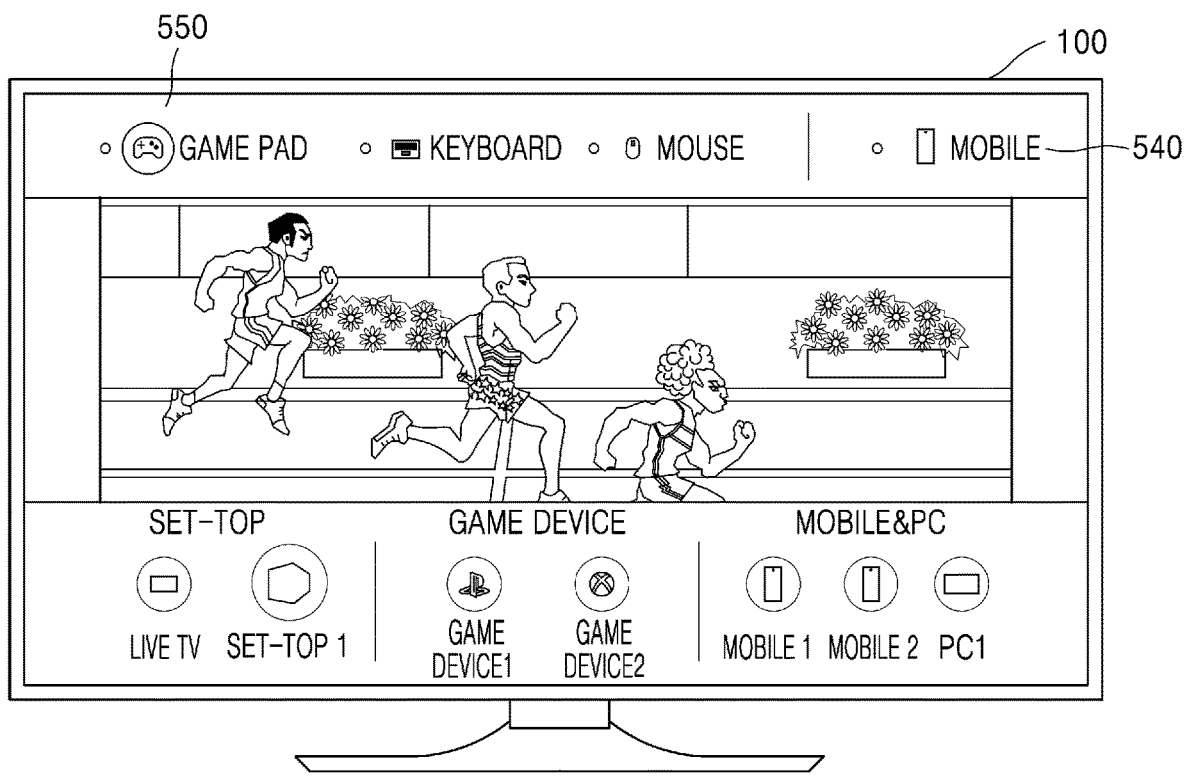
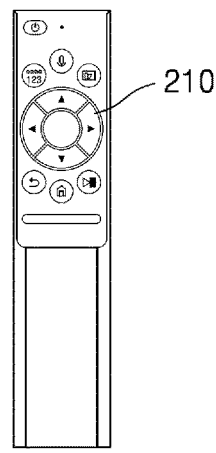

FIG. 12B
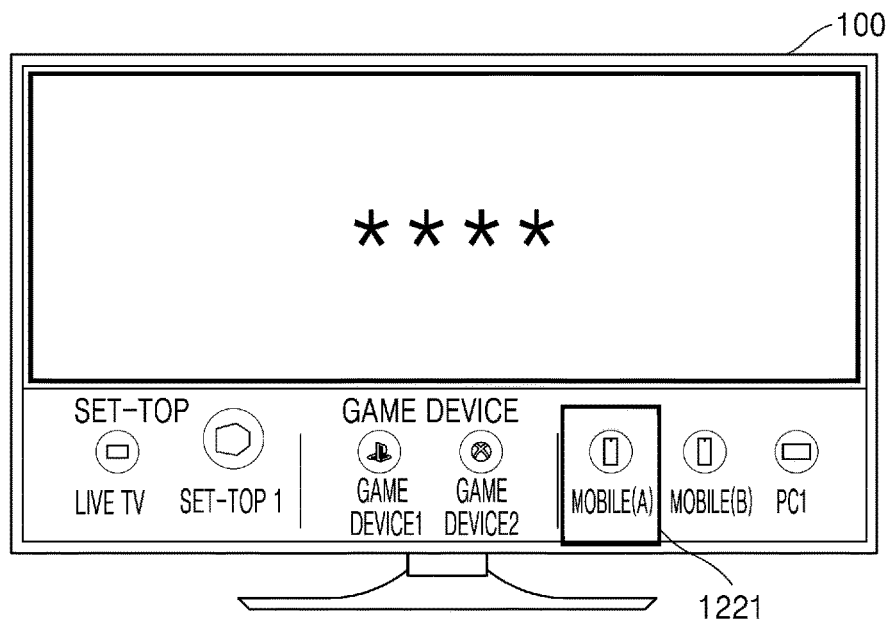
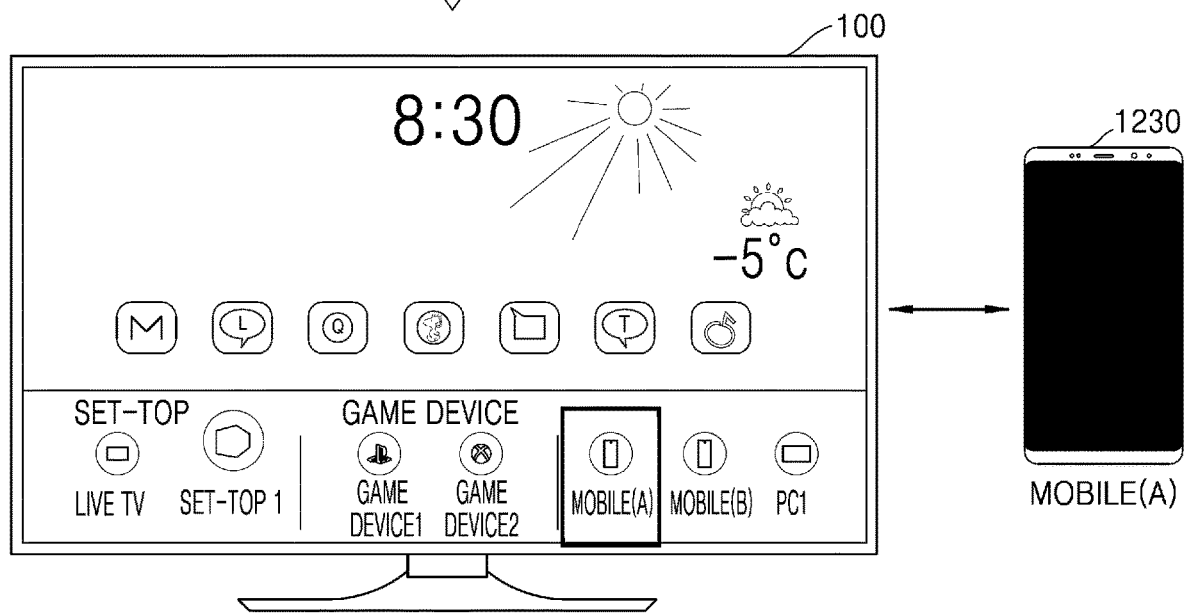

DISPLAY DEVICE AND OPERATING METHOD THEREFOR

CROSS-REFERENCE TO RELATED APPLICATIONS

This application is a by-pass continuation application of International Application No. PCT/KR2021/001369, filed on Feb. 2, 2021, which is based on and claims priority to Korean Patent Application No. 10-2021-0003564, filed on Jan. 11, 2021, in the Korean Intellectual Property Office, the disclosures of which are incorporated by reference herein their entireties.

BACKGROUND

1. Field

The disclosure relates to a display apparatus and an operating method thereof, and more particularly, to a display apparatus for controlling a source device connected to the display apparatus by using an input device connected to the display apparatus, and an operating method of the display apparatus.

2. Description of Related Art

With the development of wired and wireless communication networks, various types of source devices may be connected to display apparatuses such as televisions (TVs), and content provided from the source devices may be used through the display apparatuses. In this case, an input device for controlling each source device needs to be individually connected to the source device, and thus, user convenience may be reduced, and users may have a distracted and unintegrated experience.

SUMMARY

Provided are a display apparatus for pairing a source device connected to the display apparatus with an input device connected to the display apparatus, to enable the paired source device to be easily used and operated using the paired input device, and an operating method of the display apparatus.

According to an aspect of the disclosure, a display apparatus includes: a display; a communicator; a memory configured to store at least one instruction; and a processor operatively connected to the memory and configured to execute the at least one instruction to: control the communicator to connect at least one source device and at least one input device to the display apparatus; control the display to display an image received from a first source device among the at least one source device; and based on input data being received from a first input device among the at least one input device, control the communicator to control the first source device based on the input data.

The processor may be further configured to execute the at least one instruction to control the communicator to connect the at least one source device and the at least one input device to the display apparatus by using at least one of Bluetooth, Wi-Fi, a high-definition multimedia interface (HDMI), or a universal serial bus (USB).

The processor may be further configured to execute the at least one instruction to connect the first source device with the first input device, based on a user input selecting the first source device and the first input device.

The processor may be further configured to execute the at least one instruction to control the communicator to transmit, to the first input device, the image received from the first source device.

The processor may be further configured to execute the at least one instruction to: connect the first source device with a second input device among the at least one input device; and based on a second input data being received from the second input device, control the communicator to control the first source device.

The processor may be further configured to execute the at least one instruction to: connect a second source device among the at least one source device with a third input device among the at least one input device; and based on a third input data being received from the third input device, control the communicator to control the second source device.

The processor may be further configured to execute the at least one instruction to: based on an input to the display apparatus is indicating a switching from the first source device to the second source device, control the display to display an image received from the second source device; and control the communicator to maintain a connected state between the first source device and the first input device.

The processor may be further configured to execute the at least one instruction to: based on a connection request between a second source device among the at least one source device and the first input device being received, disconnect the first source device and the first input device from the display apparatus, and connect the second source device with the first input device.

The processor may be further configured to execute the at least one instruction to: convert the input data received from the first input device into input information corresponding to the first source device; and control the communicator to transmit the input information to the first source device.

The processor may be further configured to execute the at least one instruction to: map at least one object of the image received from the first source device to at least one button or key of the first input device, and convert the input data into the input information based on the mapping of the at least one object to the at least one button or key.

The processor may be further configured to execute the at least one instruction to convert the input data into the input information based on layout information about the image received from the first source device.

The processor may be further configured to execute the at least one instruction to: based on the first source device being in a locked state, control the display to display a screen requesting a password; and based on the password being received from the first input device, display the image received from the first source device.

According to an aspect of the disclosure, an operating method of a display apparatus, includes: connecting at least one source device to the display apparatus and at least one input device to the display apparatus; displaying an image received from a first source device among the at least one source device; receiving an input data from a first input device among the at least one input device; and controlling the first source device based on the input data.

The connecting the at least one source device to the display apparatus and the at least one input device to the display apparatus may include connecting the at least one source device to the display apparatus and the at least one input device to the display apparatus by using at least one of Bluetooth, Wi-Fi, a high-definition multimedia interface (HDMI), and a universal serial bus (USB).

According to an aspect of the disclosure, a non-transitory computer-readable recording medium storing therein a program that is executable by a process of a computer to perform the operating method.

According to one or more embodiments, by using an input device connected to a display apparatus, a source device connected to the display apparatus may be easily and quickly used and operated.

According to one or more embodiments, a display apparatus may improve a distracted and unintegrated connection experience by integrally controlling all source devices and input devices connected to the display apparatus.

According to one or more embodiments, source devices connected to a display apparatus may be used by using a remote controller, such that an experience of integrated usability may be increased.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 5A to 5C are diagrams referenced to describe a method of pairing source devices and input devices connected to a display apparatus with each other, according to an embodiment;

FIGS. 12A to 12C are diagrams illustrating a process of setting a source device as an input of a display apparatus according to locked states of source devices, according to an embodiment;

DETAILED DESCRIPTION

Figure 1:
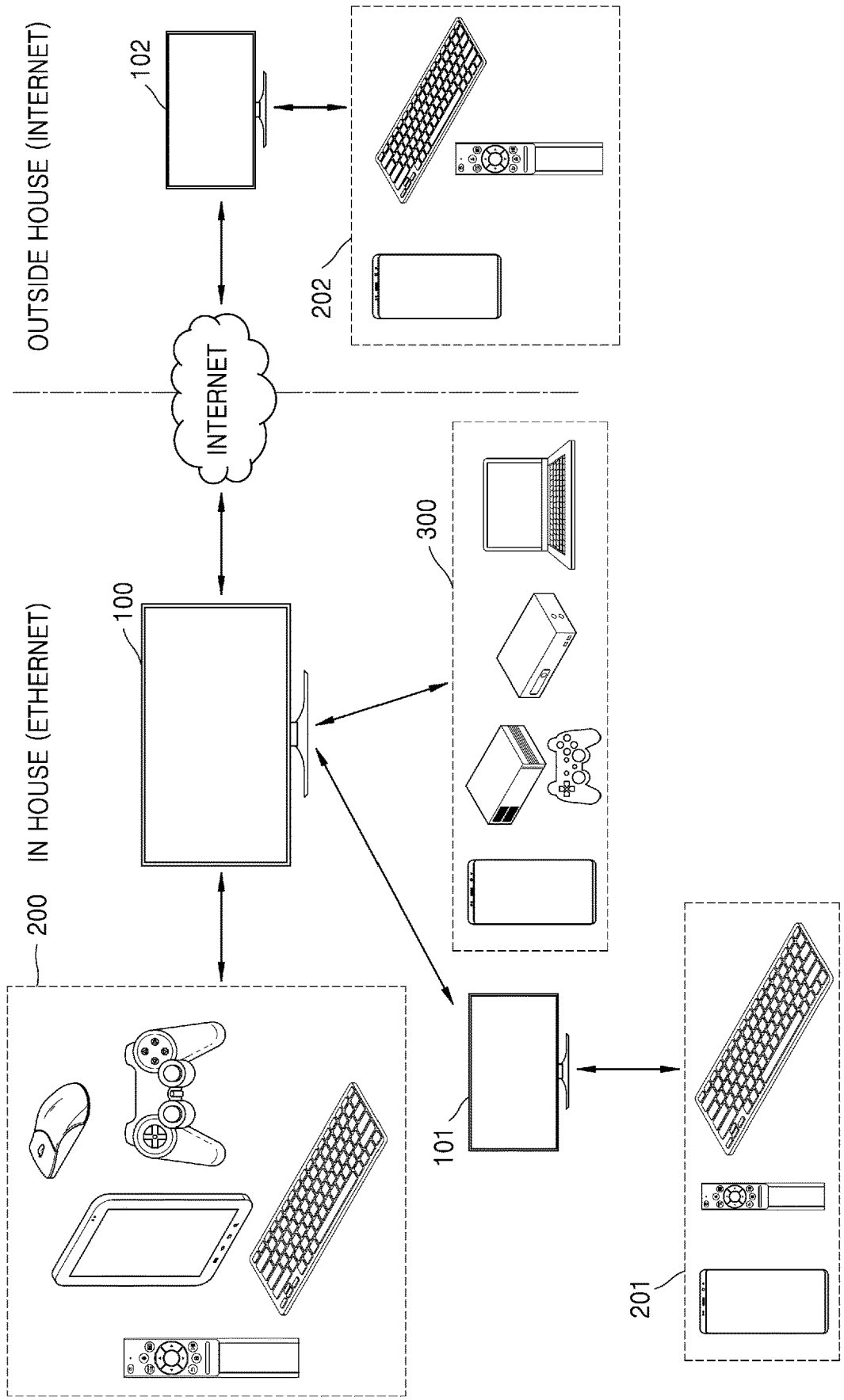
FIG. 1 is a diagram of a display apparatus, and source devices and input devices connected to the display apparatus, according to an embodiment.

Hereinafter, terms used in the specification will be briefly described, and the disclosure will be described in detail.

The terms used in the disclosure are those general terms currently widely used in the art in consideration of functions in regard to the disclosure, but the terms may vary according to the intention of those of ordinary skill in the art, precedents, or new technology in the art. Also, specified terms may be selected by the applicant, and in this case, the detailed meaning thereof will be described in the detailed description of the disclosure. Thus, the terms used in the disclosure should be understood not as simple names but based on the meaning of the terms and the overall description of the disclosure.

Throughout the specification, when a portion "includes" a component, another component may be further included, rather than excluding the existence of the other component, unless otherwise described. In addition, terms such as " . . . or/er", " . . . module", or the like refer to units that perform at least one function or operation, and the units may be implemented as hardware or software or as a combination of hardware and software.

In the embodiment of the disclosure, the term "user" refers to a person who controls functions or operations of a home appliance (or peripheral device), a display apparatus, and a mobile apparatus, and may include an administrator or an installation engineer.

Embodiments will now be described with reference to the accompanying drawings in such a manner that the embodiments may be easily carried out by one of skill in the art. The disclosure may, however, be embodied in many different forms and should not be construed as limited to the embodiments set forth herein. In addition, components not related to description are omitted in the drawings for clear description of the disclosure, and like reference numerals in the drawings denote like components throughout the specification.

FIG. 1 is a diagram of a display apparatus, and source devices and input devices connected to the display apparatus, according to an embodiment.

Referring to FIG. 1, source devices 300 and input devices 200 according to an embodiment may be connected to a display apparatus 100 through wired/wireless communication.

The display apparatus 100 according to an embodiment, which is an electronic apparatus including a display, may be implemented in various forms such as a television (TV), a mobile phone, a tablet personal computer (PC), a digital camera, a camcorder, a laptop computer, a tablet PC, a desktop computer, an e-book reader, a digital broadcast receiver, a personal digital assistant (PDA), a portable media player (PMP), a navigation device, an MP3 player, and a wearable device. Also, the display apparatus 100 may be a stationary electronic apparatus arranged at a fixed location or a mobile electronic apparatus, or be a digital broadcast receiver capable of receiving a digital broadcast. In particular, embodiments may be easily implemented in a display apparatus having a large display such as a TV, but are not limited thereto.

Also, the source devices 300 according to an embodiment are electronic apparatuses that provide content such as an image, text, and audio, and may include a TV, a mobile phone, a tablet PC, a laptop computer, a tablet PC, a desktop computer, a set-top box, a game console, a game player, a digital versatile disk (DVD) player, a Blue Ray disk, and the like. However, the disclosure is not limited thereto.

Also, the input devices 200 according to an embodiment may be implemented as various forms of apparatuses for controlling the source devices 300 and may include a remote controller, a mobile phone, a tablet PC, a mouse, a keyboard, a game controller (e.g., a game pad), and the like. However, the disclosure is not limited thereto.

Also, some of the source devices 300 according to an embodiment may be used as the input devices 200. For example, a mobile apparatus such as a mobile phone or a table PC may be used as a source device or as an input device.

The input devices 200 and the source devices 300 according to an embodiment may be connected to the display apparatus 100 through a wired or wireless network. For example, the input devices 200 may be connected to the display apparatus 100 by using Bluetooth (BT), a wireless local area network (WLAN) (Wi-Fi), a universal serial bus (USB), or the like. Also, the source devices 300 may be connected to the display apparatus 100 by using BT, a WLAN (Wi-Fi), a USB, a high-definition multimedia interface (HDMI), or the like. However, the disclosure is not limited thereto, and the input devices 200 and the source devices 300 may be connected to the display apparatus 100 by using various wired/wireless communication schemes.

The source devices 300 and the input devices 200 connected to the display apparatus 100 may be paired with each other, and a paired source device may be controlled by using a paired input device. In this case, when a source device and an input device are paired with each other, it may mean that the paired source device may be controlled by the paired input device by connecting the source device and the input device connected to the display apparatus 100 to each other. The display apparatus 100 according to an embodiment may match the source device and the input device connected to the display apparatus 100 to each other and may relay input data or image data between the matched source device and input device.

For example, when a first source device among the source devices connected to the display apparatus 100 and a first input device among the input devices connected to the display apparatus 100 are paired (connected or matched) with each other, the display apparatus 100 may receive input data from the first input device and control the first source device based on the received input data.

Also, the display apparatus 100 may be connected to another display apparatus 101 in a house through Ethernet, and other input devices 201 may be connected to the other display apparatus 101 in the house. When a second input device connected to the other display apparatus 101 and the first source device connected to the display apparatus 100 are paired with each other, the first source device connected to the display apparatus 100 may be controlled by using the second input device connected to the other display apparatus 101.

Also, the display apparatus 100 may be connected to another display apparatus 102 outside the house through the Internet. Also, the other display apparatus 102 outside the house may be connected to input devices 202, and source devices connected to the display apparatus 100 in the house may be controlled by using the input devices 202 connected to the other display apparatus 102 outside the house.

Figure 2:
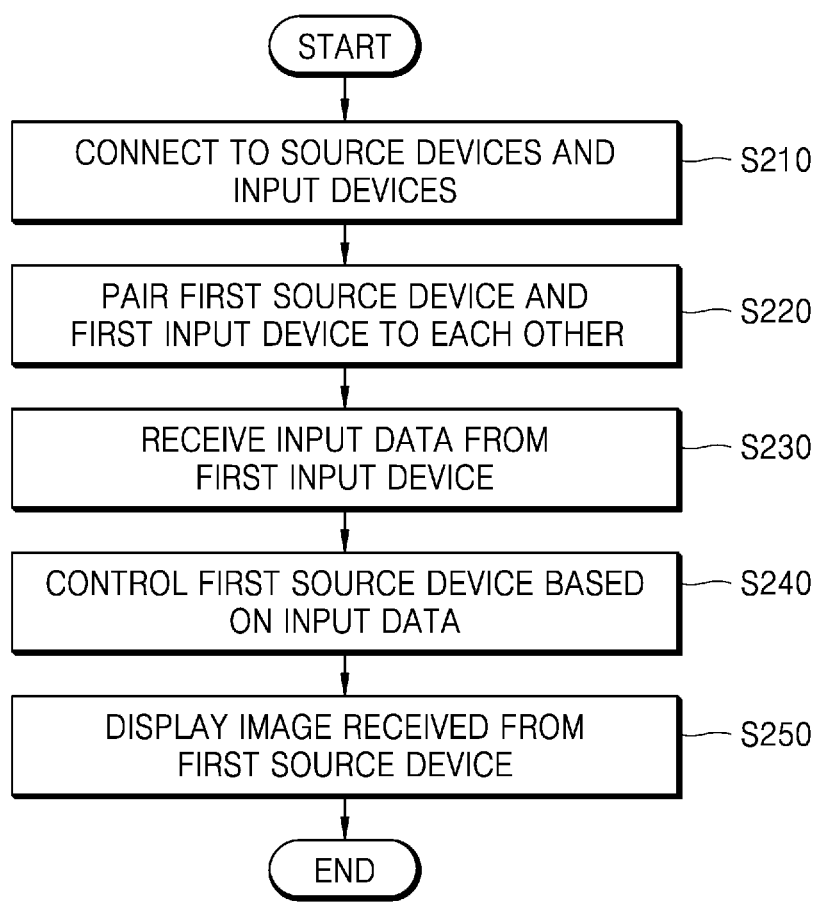
FIG. 2 is a flowchart of an operating method of a display apparatus according to an embodiment.

FIG. 2 is a flowchart of an operating method of a display apparatus according to an embodiment.

Referring to FIG. 2, input devices and source devices according to an embodiment may be connected to the display apparatus 100 through a wired or wireless network (S210).

For example, the input devices 200 may be connected to the display apparatus 100 by using BT, a WLAN (Wi-Fi), a USB, or the like. Also, the source devices may be connected to the display apparatus 100 by using BT, a WLAN (Wi-Fi), a USB, an HDMI, or the like. However, the disclosure is not limited thereto, and the input devices and the source devices may be connected to the display apparatus 100 by using various wired/wireless communication schemes. A method of connecting the source devices and the input devices to the display apparatus 100 will be described in detail below with reference to FIGS. 3 and 4.

The source devices and the input devices connected to the display apparatus 100 according to an embodiment may be paired with each other (S220). For example, based on a user input of selecting a first source device from among the source devices and a first input device from among the input devices, the display apparatus 100 may connect the first source device and the first input device to each other. However, the disclosure is not limited thereto. The display apparatus 100 may relay input data between the paired first input device and first source device.

The display apparatus 100 according to an embodiment may receive input data from the first input device (S230) and control the first source device paired with the first input device based on the received input data (S240).

The display apparatus 100 may convert the input data received from the first input device into input information corresponding to the first source device and transmit the input information to the first source device. For example, the display apparatus 100 may map an input for each of one or more objects included in an image received from the first source device to an input for each of one or more buttons or keys included in the first input device, and convert input data into input information based on mapping information. Alternatively, the display apparatus 100 may convert input data into input information based on layout information about the image received from the first source device. However, the disclosure is not limited thereto.

The first source device may receive the input information, render an image to which a motion corresponding to the input information is applied, and transmit the image to the display apparatus 100.

The display apparatus 100 may display the image received from the first source device (S250).

Figure 3:
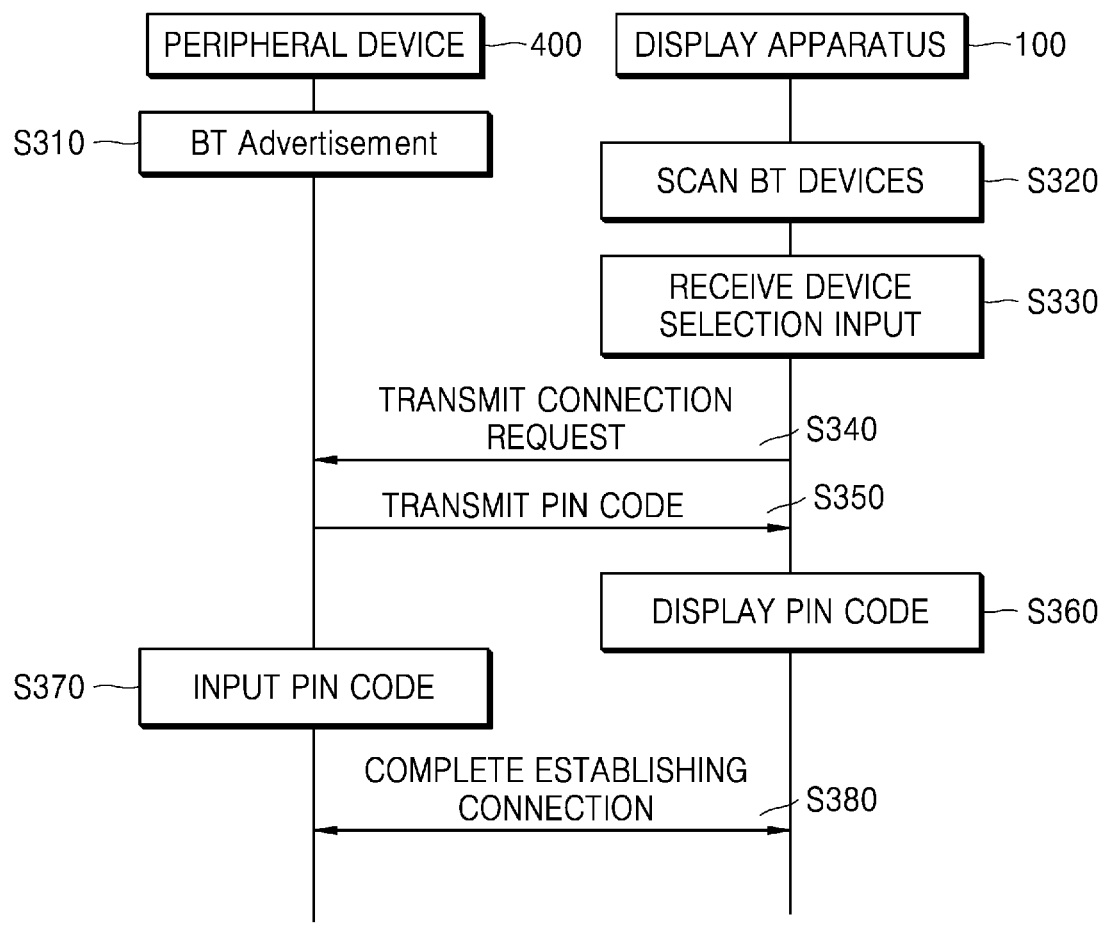
FIG. 3 is a flowchart of a process of connecting a display apparatus and a peripheral device to each other in a first communication scheme, according to an embodiment.

FIG. 3 is a flowchart of a process of connecting a display apparatus and a peripheral device to each other in a first communication scheme, according to an embodiment.

A peripheral device 400 according to an embodiment may be one of the source devices 300 or the input devices 200 of FIG. 1.

Referring to FIG. 3, the peripheral device 400 and the display apparatus 100 according to an embodiment may be connected to each other by using BT or Bluetooth low energy (BLE) communication. For example, the peripheral device 400 may transmit a BT advertisement packet (S310), and the display apparatus 100 may search for peripheral devices by using BT communication (S320) and display the searched peripheral devices.

Also, the display apparatus 100 may receive a user input of selecting one of the searched peripheral devices (S330).

When a peripheral device to be connected is selected, the display apparatus 100 may transmit a connection request to the selected peripheral device (S340).

When the connection request is received from the display apparatus 100, the peripheral device 400 may transmit a personal identification number (PIN) code to the display apparatus 100 (S350). The display apparatus 100 may display the PIN code received from the peripheral device 400 on a display, and a user may input the PIN code displayed on the display apparatus 100 into the peripheral device 400 (S370).

The peripheral device 400 may determine whether the PIN code transmitted to the display apparatus 100 and the input PIN code are identical to each other, and when the PIN codes are identical, may complete establishing a connection with the display apparatus 100 (S380).

Figure 4:
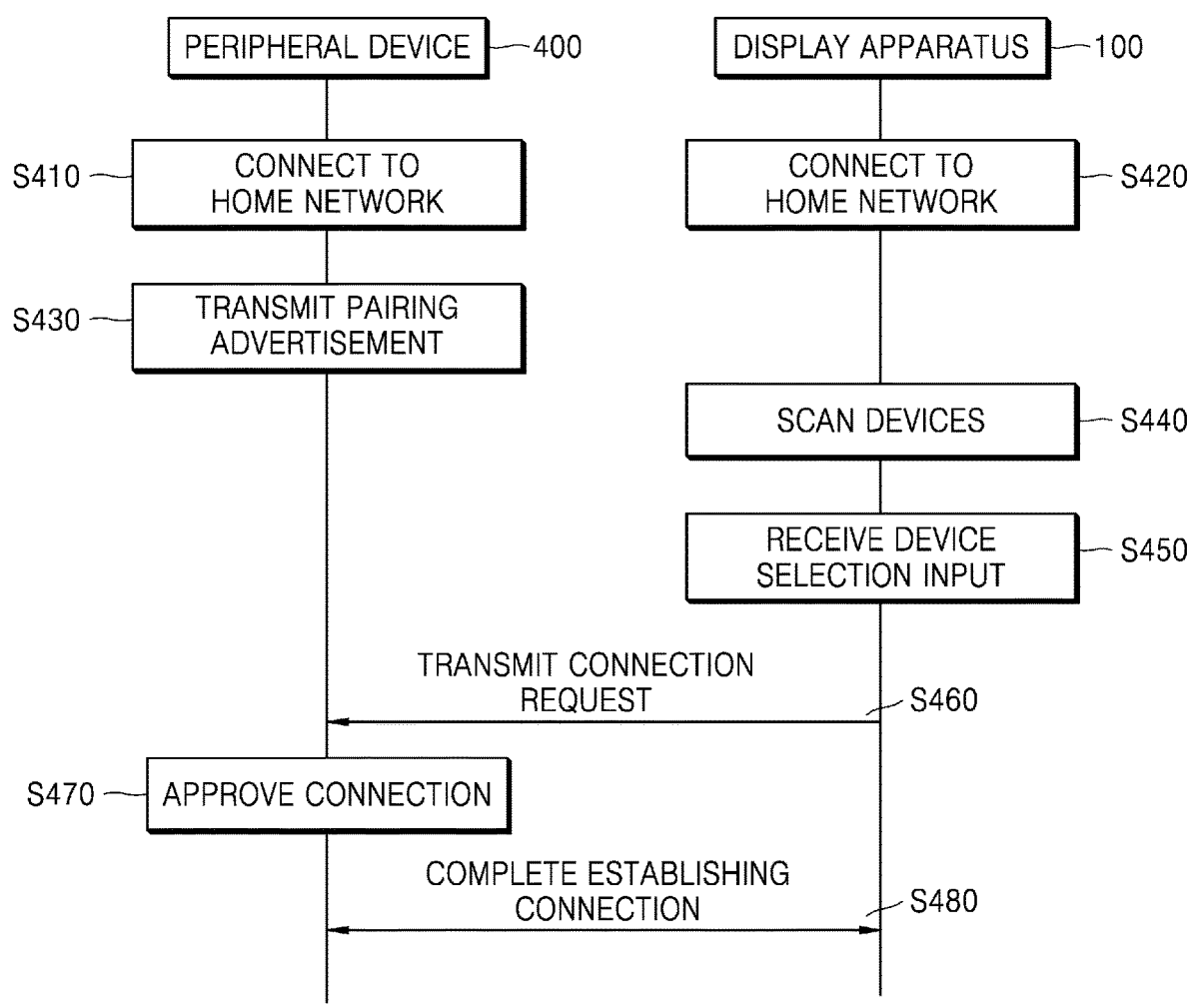
FIG. 4 is a flowchart of a process of connecting a display apparatus and a peripheral device to each other in a second communication scheme, according to an embodiment.

FIG. 4 is a flowchart of a process of connecting a display apparatus and a peripheral device to each other in a second communication scheme, according to an embodiment.

Referring to FIG. 4, the peripheral device 400 and the display apparatus 100 according to an embodiment may be connected to each other by using WLAN.

For example, the peripheral device 400 and the display apparatus 100 may be connected to the same home network (S410, S420).

The peripheral device 400 may transmit a pairing advertisement packet requesting pairing (S430), and the display apparatus 100 may search for devices within the same home network by using a multicast domain name system (mDNS) method (S440) and display searched peripheral devices.

Also, the display apparatus 100 may receive a user input of selecting one of the searched peripheral devices (S450).

When a peripheral device to be connected is selected, the display apparatus 100 may transmit a connection request to the selected peripheral device (S460).

When the connection request is received from the display apparatus 100, the peripheral device 400 may approve a connection (S470) and complete establishing the connection with the display apparatus 100 (S480).

FIGS. 5A to 5C are diagrams referenced to describe a method of pairing source devices and input devices connected to a display apparatus with each other, according to an embodiment.

Referring to FIG. 5A, the display apparatus 100 according to an embodiment may display, on a display, an image 510 received from a source device currently set as an input of the display apparatus 100.

The display apparatus 100 may receive, from a first input device 210 (e.g., a remote controller), an input of a down arrow key among four direction keys included in the first input device 210.

As shown in FIG. 5B, when the input of the down arrow key is received, the display apparatus 100 may display, at the bottom of a display screen, a source device list 520 including items indicating one or more source devices connected to the display apparatus 100. However, the location where the source device list 520 is displayed is not limited thereto, and the source device list 520 may be displayed at various locations on the display screen. When the source device list 520 is displayed, the display apparatus 100 may receive an input of selecting one of one or more source device items included in the source device list 520. For example, the display apparatus 100 may receive an input of selecting an item 530 corresponding to a 'set-top box' from the source device list. The display apparatus 100 may switch the input of the display apparatus 100 to a selected source device (e.g., the 'set-top box') and display an image received from the 'set-top box' on the display.

Also, the display apparatus 100 may receive an input of an up arrow key among the four direction keys from the first input device 210. As shown in FIG. 5C, when the input of the up arrow key is received, the display apparatus 100 may display, at the top of the display screen, an input device list 540 including items indicating one or more input devices connected to the display apparatus 100. However, the location where the input device list 540 is displayed is not limited thereto, and the input device list 540 may be displayed at various locations on the display screen.

When the input device list 540 is displayed, the display apparatus 100 may receive an input of selecting one of one or more input device items included in the input device list 540. For example, the display apparatus 100 may receive an input of selecting an item 550 indicating a 'game pad' from the input device list 540. The display apparatus 100 may control a selected input device and a selected source device to be paired with each other. For example, as shown in FIG. 5C, the set-top box (source device) and the game pad (input device) may be paired with each other, and when the set-top box and the game pad are paired with each other, the display apparatus 100 may use the game pad to control the image (screen) received from the set-top box displayed on the display apparatus 100.

Figure 6:
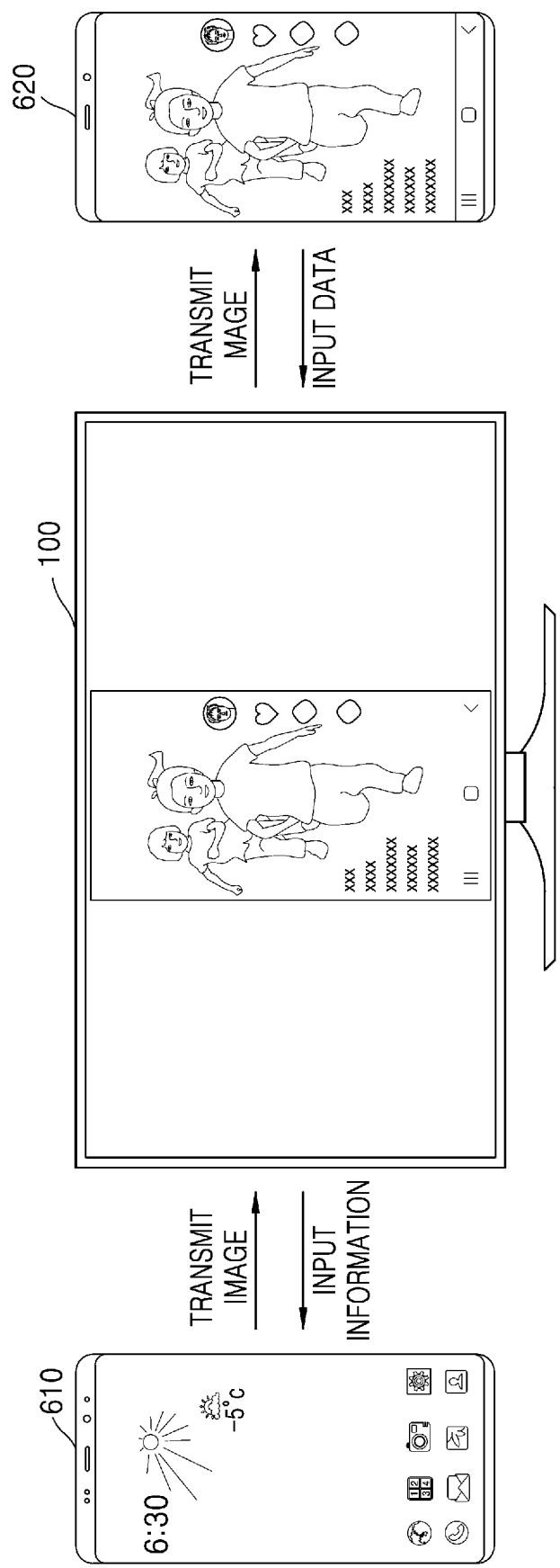
FIG. 6 is a diagram referenced to describe an operation when a source device and an input device are connected to each other by 1:1, according to an embodiment.

FIG. 6 is a diagram referenced to describe an operation when a source device and an input device are connected to each other by 1:1, according to an embodiment.

Referring to FIG. 6, a first source device 610 among source devices connected to the display apparatus 100 according to an embodiment and a first input device 620 among input devices connected to the display apparatus 100 may be paired with each other.

When the first source device 610 and the first input device 620 are paired (connected) with each other, the display apparatus 100 may receive input data from the first input device 620 and control the first source device 610 based on the received input data. For example, as shown in FIG. 6, when an input of the display apparatus 100 is set to the first source device 610, the display apparatus 100 may display, on a display, an image received from the first source device 610. In this case, the image received from the first source device 610 may be the same as an image displayed on the first source device 610, or may be an image rendered in a background environment of the first source device 610 and be different from the image displayed on the first source device 610.

The display apparatus 100 may receive input data from the first input device 620. In this case, the input data may be an input of controlling an image displayed on the display apparatus 100 and may include various types of inputs, such as a touch input, a button input, a key input, and a speech input.

The display apparatus 100 may convert the input data received from the first source device 610 into input information corresponding to the first source device 610 and transmit the input information to the first source device 610.

The first source device 610 may render an image based on the received input information and transmit the rendered image to the display apparatus 100. The display apparatus 100 may display the rendered image based on the input information. Accordingly, the image (screen) displayed on the display may be controlled based on the input data received from the first input device 620.

Also, when the first source device 610 is a device including a display, the display apparatus 100 may transmit the image received from the first source device 610 (image displayed on the display apparatus 100) to the first input device 620. The first input device 620 may display the image received from the display apparatus 100.

Figure 7:
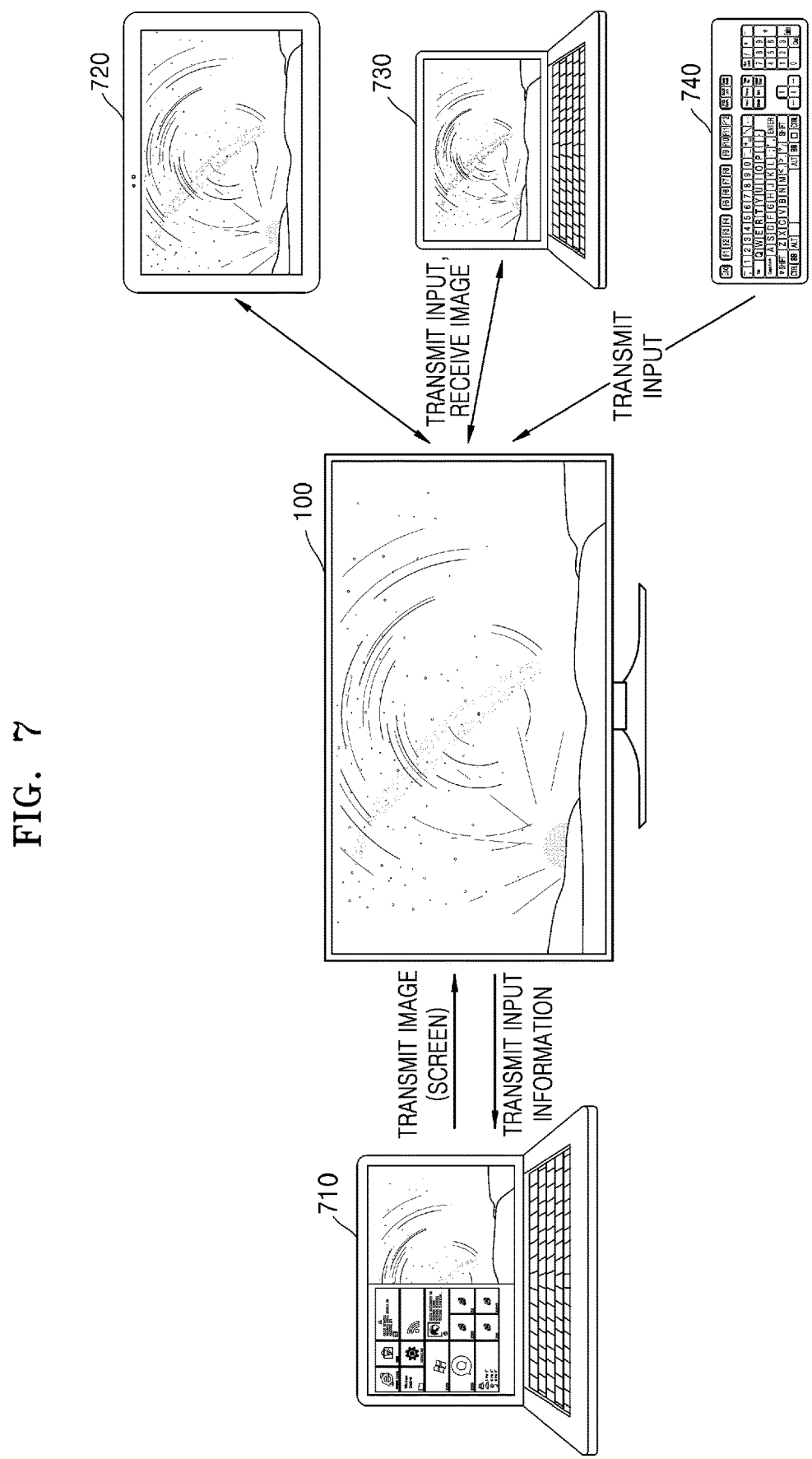
FIG. 7 is a diagram referenced to describe an operation when a source device and an input device are connected to each other by 1:N, according to an embodiment.

FIG. 7 is a diagram referenced to describe an operation when a source device and an input device are connected to each other by 1:N, according to an embodiment.

Referring to FIG. 7, one source device according to an embodiment may be paired with a plurality of input devices. For example, a second source device 710 among source devices connected to the display apparatus 100 and a second input device 720, a third input device 730, and a fourth input device 740 among input devices connected to the display apparatus 100 may be paired with each other.

When an image is received from the second source device 710, the display apparatus 100 may display the received image on a display. When the image received from the second source device 710 is displayed, the display apparatus 100 may control the image displayed on the display by using the second input device 720, the third input device 730, and the fourth input device 740. This has been described in detail with reference to FIG. 6, and thus, a detailed description thereof will be omitted.

Also, the second input device 720 and the third input device 730 may respectively be a tablet and a PC, which are devices each including a display, and the fourth input device 740 may be a keyboard, which is a device that does not include a display. Accordingly, the display apparatus 100 may transmit the image received from the second source device 710 (screen displayed on the display apparatus 100) to the second input device 720 and the third input device 730, and may not transmit the image (screen) to the fourth input device 740.

Also, the second input device 720 and the third input device 730 may display the image received from the display apparatus 100 on the display.

Figure 8:
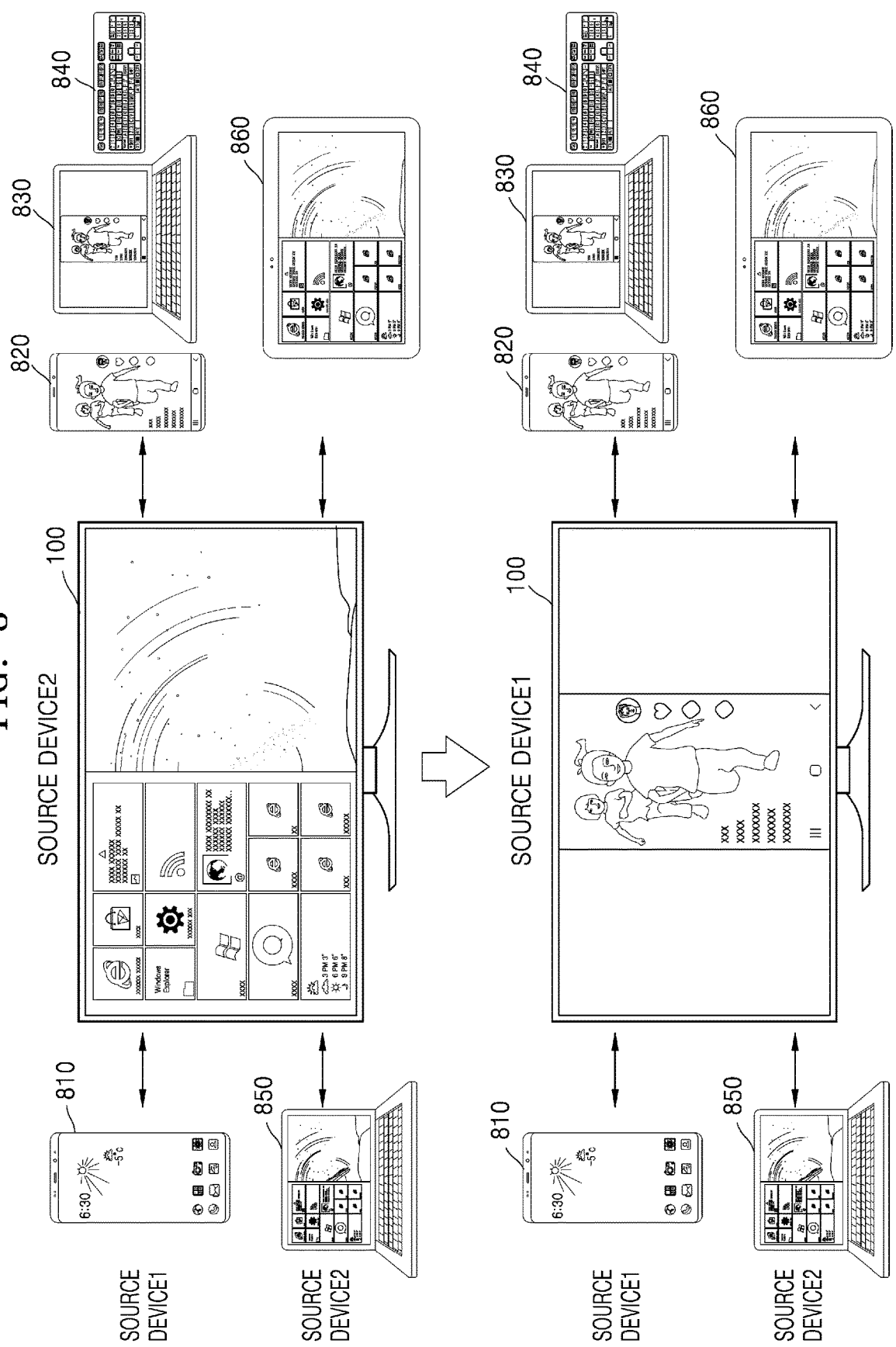
FIG. 8 is a diagram referenced to describe an operation when an input of a display apparatus is changed, according to an embodiment.

FIG. 8 is a diagram referenced to describe an operation when an input of a display apparatus is changed, according to an embodiment.

Referring to FIG. 8, a first source device 810 connected to the display apparatus 100 according to an embodiment may be paired (connected or matched) with a first input device 820, a second input device 830, and a third input device 840. The display apparatus 100 may select, as an input, a second source device 850 from among one or more source devices connected to the display apparatus 100 and pair a fourth input device 860 with the second source device 850. The display apparatus 100 may display an image received from the second source device 850 and control the displayed image based on input data received from the fourth input device 860.

In addition, when there is a pairing (connection or matching) request between the second input device 830 and the second source device 850 while the second input device 830 is paired (connected or matched) with the first source device 810, the display apparatus 100 may release the paired (connected or matched) state between the second input device 830 and the first source device 810 and control the second input device 830 and the second source device 850 to be paired with each other.

When an input of the display apparatus 100 according to an embodiment is changed from the second source device 850 to the first source device 810, the display apparatus 100 may display an image received from the first source device 810 and control the displayed image based on input data received from the first input device 820, the second input device 830, and the third input device 840.

In this case, the image received from the second source device 850 is not displayed on the display apparatus 100, but may be displayed on a display of the fourth input device 860, and the paired (connected or matched) state between the second source device 850 and the fourth input device 860 may be maintained. Accordingly, the image received from the second source device 850 may be controlled based on the input data received from the fourth input device 860. However, the disclosure is not limited thereto.

Figure 9:
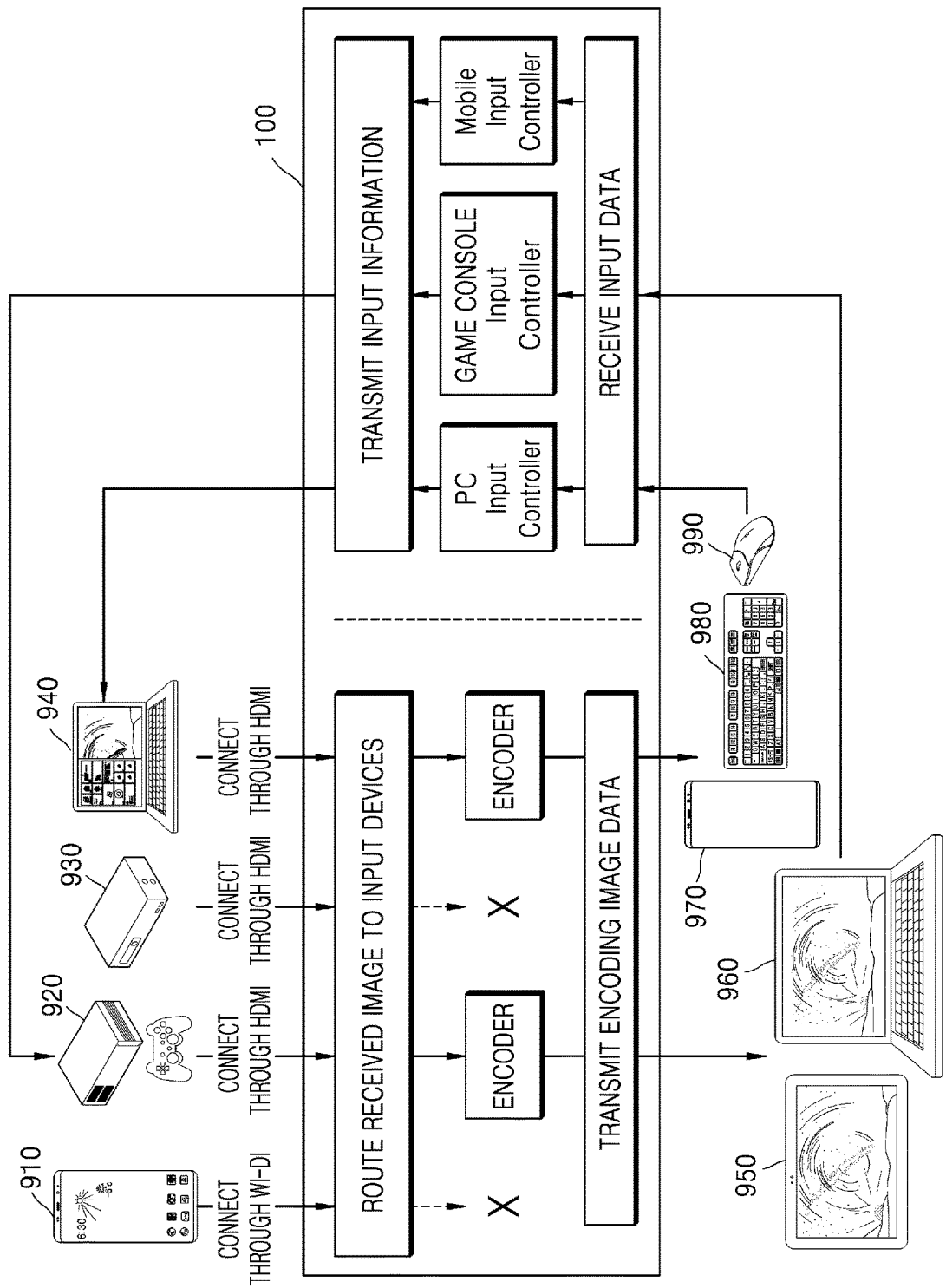
FIG. 9 is a diagram illustrating a method, performed by a display apparatus, of controlling source devices by using input devices, according to an embodiment.

FIG. 9 is a diagram illustrating a method, performed by a display apparatus, of controlling source devices by using input devices, according to an embodiment.

Referring to FIG. 9, a first source device 910, a second source device 920, a third source device 930, and a fourth source device 940 may be connected to the display apparatus 100 according to an embodiment. For example, the first source device 910 may be connected to the display apparatus 100 through a wireless display (Wi-Di), and the second source device 920, the third source device 930, and the fourth source device 940 may be connected to the display apparatus 100 through an HDMI. However, the disclosure is not limited thereto, the source devices may be connected to the display apparatus 100 through various types of wired/wireless communication.

Also, a first input device 950, a second input device 960, a third input device 970, a fourth input device 980, and a fifth input device 990 may be connected to the display apparatus. For example, the first input device 950 and the second input device 960 may be paired (connected or matched) with the second source device 920, and the third input device 970, the fourth input device 980, and the fifth input device 990 may be paired (connected or matched) with the fourth source device 940.

Also, the first source device 910 and the third source device 930 connected to the display apparatus 100 are not paired (connected or matched) with any input device.

The display apparatus 100 according to an embodiment may route an image received from a source device to an input device paired (connected or matched) with the source device. For example, the display apparatus 100 may receive a second image from the second source device 920. When the first input device 950 and the second input device 960 paired (connected or matched) with the second source device 920 each include a display, the display apparatus 100 may encode the second image and transmit the same to the first input device 950 and the second input device 960.

Also, the display apparatus 100 may receive a fourth image from the fourth source device 940. When the third input device 970 paired (connected or matched) with the fourth source device includes a display, the display apparatus 100 may encode the fourth image and transmit the same to the third input device 970.

Also, the display apparatus 100 may route input data received from an input device to a source device paired (connected or matched) with the input device. For example, the display apparatus 100 may receive input data from the first input device 950 and the second input device 960 and control the received input data based on an input method of the second source device 920 paired with the first input device 950 and the second input device 960. For example, when the second source device 920 is a game console, the display apparatus 100 may convert the input data received from the first input device 950 and the second input device

960 into input information corresponding to the second source device 920 according to an input method of the game console, and transmit the input information to the second source device 920. In this case, the input information may be transmitted by a communication scheme (e.g., an HDMI scheme) in which the second source device 920 and the display apparatus 100 are connected to each other.

Also, the display apparatus 100 may receive input data from the third input device 970, the fourth input device 980, and the fifth input device 990 and control the received input data based on an input method of the fourth source device 940 paired (connected or matched) with the third input device 970, the fourth input device 980, and the fifth input device 990. For example, when the fourth source device 940 is a PC, the display apparatus 100 may convert the input data received from the third input device 970, the fourth input device 980, and the fifth input device 990 into input information corresponding to the fourth source device 940 according to an input method of the PC, and transmit the input information to the fourth source device 940. In this case, the input information may be transmitted by a communication scheme (e.g., an HDMI scheme) in which the fourth source device 940 and the display apparatus 100 are connected to each other.

FIGS. 10A to 10D are diagrams illustrating examples in which a display apparatus changes input data received from an input device into input information based on a source device control method, according to an embodiment.

Figure 10A:
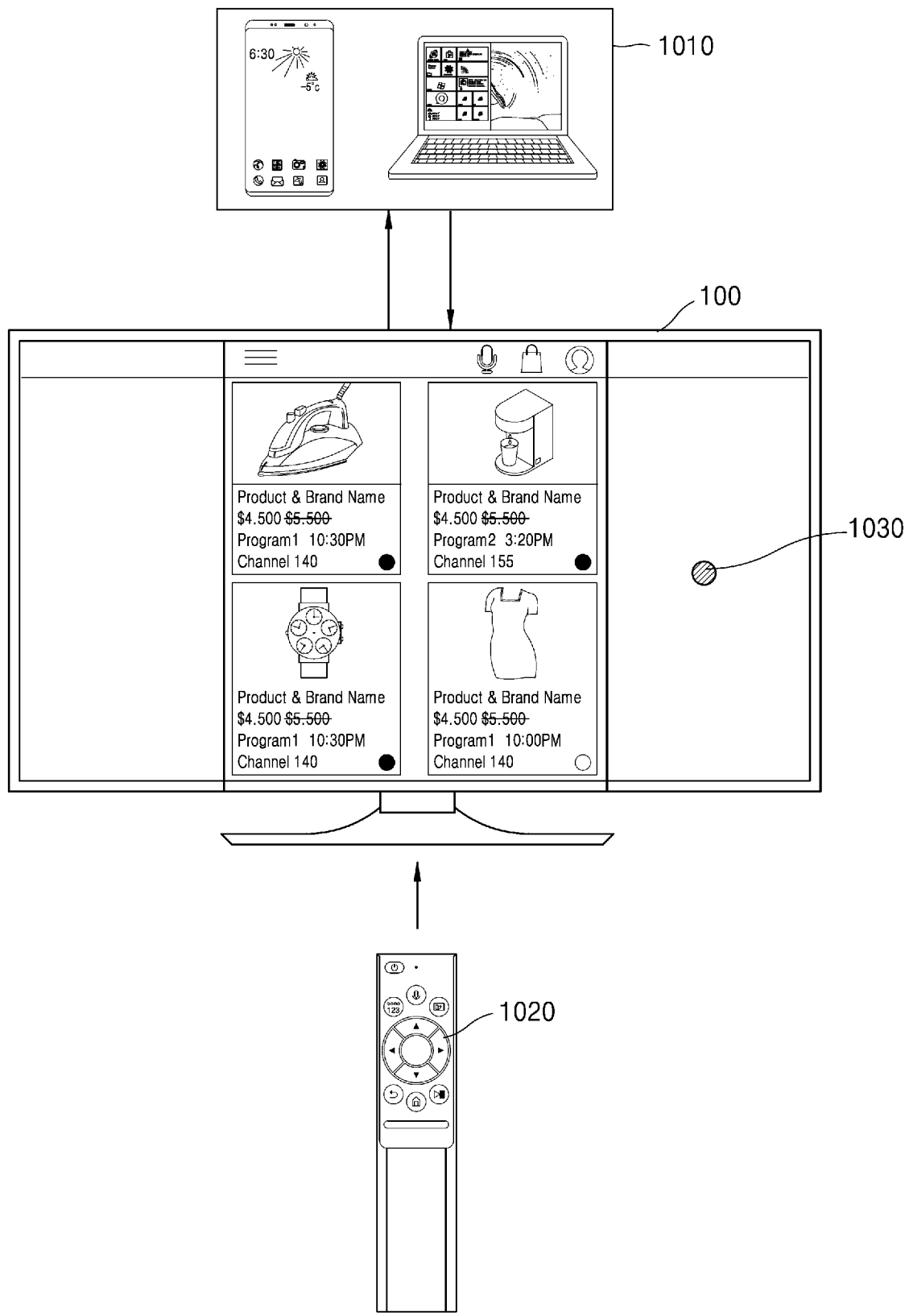
FIGS. 10A to 10D are diagrams illustrating examples in which a display apparatus changes input data received from an input device into input information based on a source device control method, according to an embodiment.

Referring to FIG. 10A, a first source device 1010 set as an input of the display apparatus 100 may be a device using a touch input or pointing input method, and a first input device 1020 paired (connected or matched) with the first source device 1010 may be a remote controller including four direction keys. Also, the display apparatus 100 may display a first image received from the first source device 1010, in which case the first image may include at least one item. In addition, the display apparatus 100 may display a cursor 1030.

The display apparatus 100 may move the cursor 1030 based on input data received from the first input device 1020. For example, when an input of long pressing (long press) a first direction key among the four direction keys included in the first input device 1020 is received, the display apparatus 100 may move the cursor 1030 in a first direction.

Also, the display apparatus 100 may convert the input data received from the first input device 1020 into input information corresponding to the first source device 1010 and transmit the input information to the first source device 1010. For example, when an input (input data) of pressing an OK key included in the first input device 1020 is received while the cursor is located over a first item included in the first image, the display apparatus 100 may convert the input into an input (input information) of touching the first item in the first image and transmit the same to the first source device 1010.

Accordingly, the first source device 1010 may receive the input information from the display apparatus 100, render a second image to which the input of touching the first item is applied, and transmit the second image to the display apparatus 100. For example, when the first item is an application item, the first source device 1010 may render an application execution screen (second image) on which a corresponding application is executed, and transmit the same to the display apparatus 100. The display apparatus 100 may display the application execution screen.

Figure 10B:
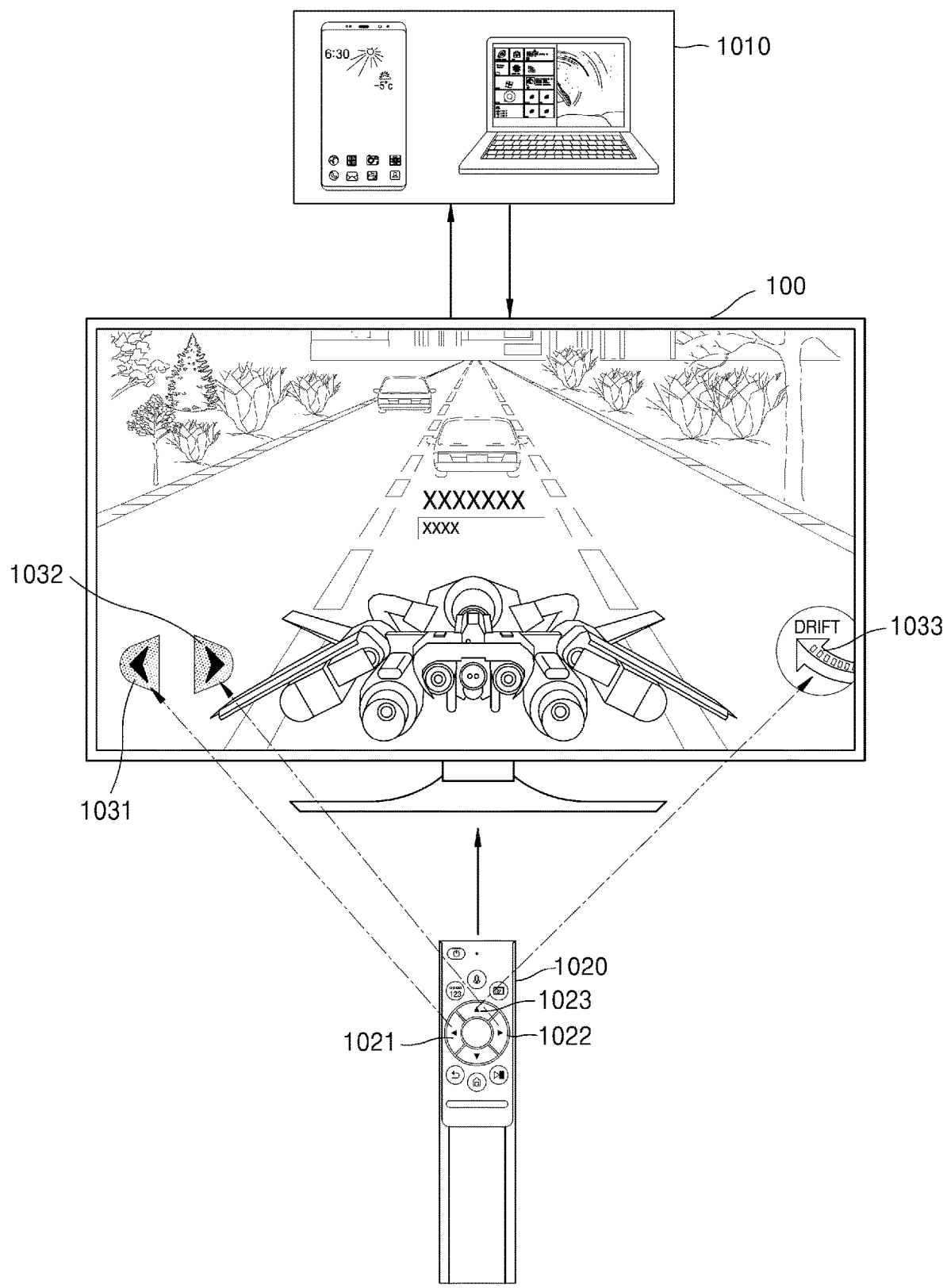

Referring to FIG. 10B, a first image received from the first source device 1010 according to an embodiment may be a game screen, and the display apparatus 100 may display the game screen. In this case, the game screen may display at least one operation icon.

The display apparatus 100 may map keys included in the first input device 1020 to operation icons included in the game screen, respectively. For example, as shown in FIG. 10B, a first key 1021 may be mapped to a first operation icon 1031, a second key 1022 may be mapped to a second operation icon 1032, and a third key 1023 may be mapped to a third operation icon (cursor) 1033.

The display apparatus 100 convert input data received from the first input device 1020 into input information based on mapping information. For example, when an input of the first key 1021 is received from the first input device 1020, the display apparatus 100 may convert the input into an input (input information) of touching the first operation icon 1031 mapped to the first key 1021 and transmit the same to the first source device 1010.

The first source device 1010 may receive the input information from the display apparatus 100, render a second image to which the input of touching the first operation icon 1031 is applied, and transmit the second image to the display apparatus 100. For example, when the first operation icon 1031 is an icon of moving a game main character to the right, the second image may be a game screen in which the game main character has moved to the right. The display apparatus 100 may display the second image.

Figure 10C:
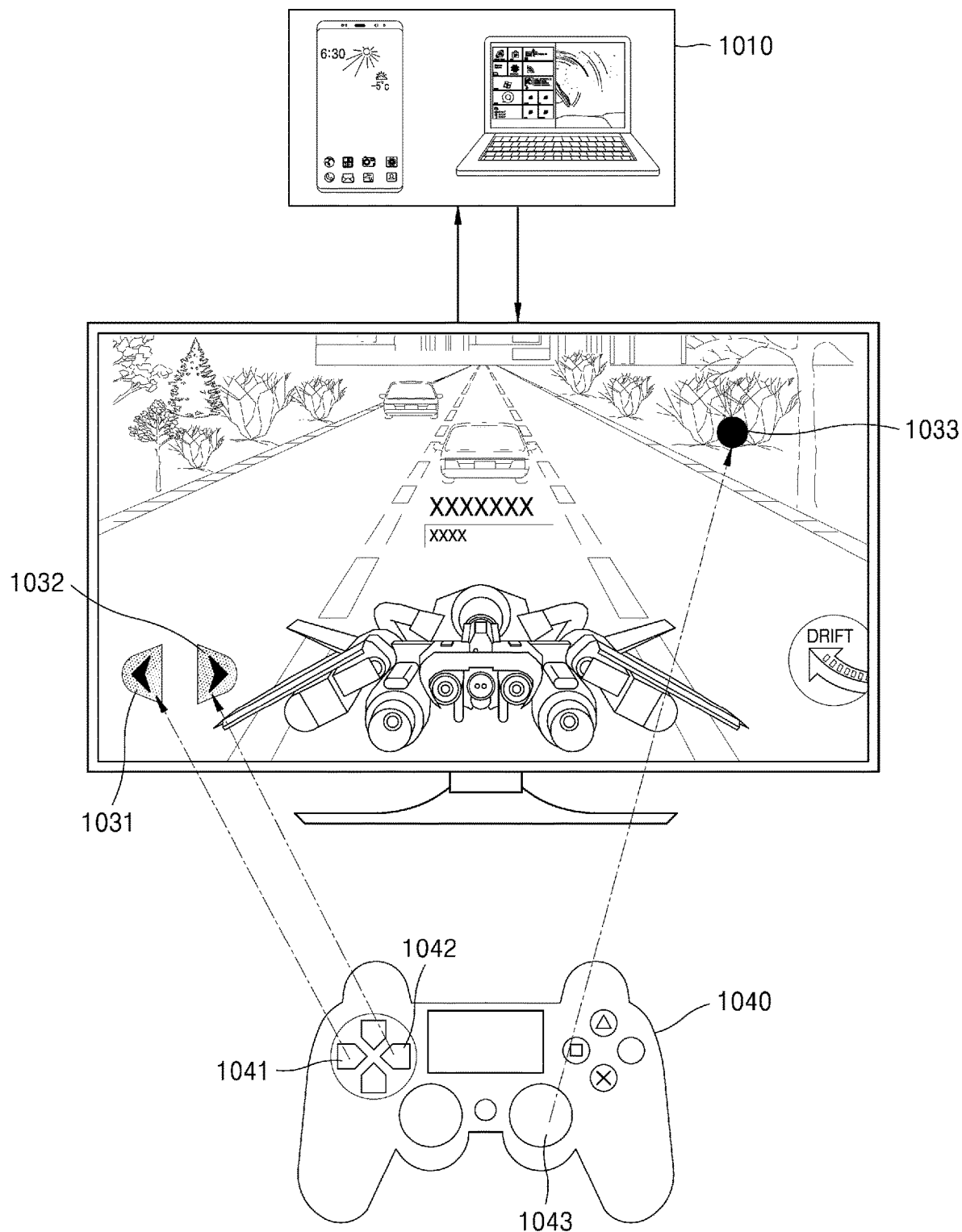

Referring to FIG. 10C, a first image received from the first source device 1010 according to an embodiment may be a game screen, and the display apparatus 100 may display the game screen. In this case, the game screen may include at least one operation icon, and the display apparatus 100 may display the third operation icon (cursor) 1033 on the game screen.

A second input device 1040 paired with the first source device 1010 may be a game controller (game pad) including buttons, a joystick, or the like.

The display apparatus 100 may map buttons included in the second input device 1040 to operation icon s included in the game screen, respectively. For example, as shown in FIG. 10C, a first button 1041 may be mapped to the first operation icon 1031, and a second button 1042 may be mapped to the second operation icon 1032.

The display apparatus 100 may convert input data received from the second input device 1040 into input information based on mapping information. This has been described in detail with reference to FIG. 10B, and thus, a detailed description thereof will be omitted.

Also, when an input of moving a joystick 1043 of the second input device 1040 in one direction is received, the display apparatus 100 may move the third operation icon (cursor) 1033 displayed on the screen in the direction.

Figure 10D:
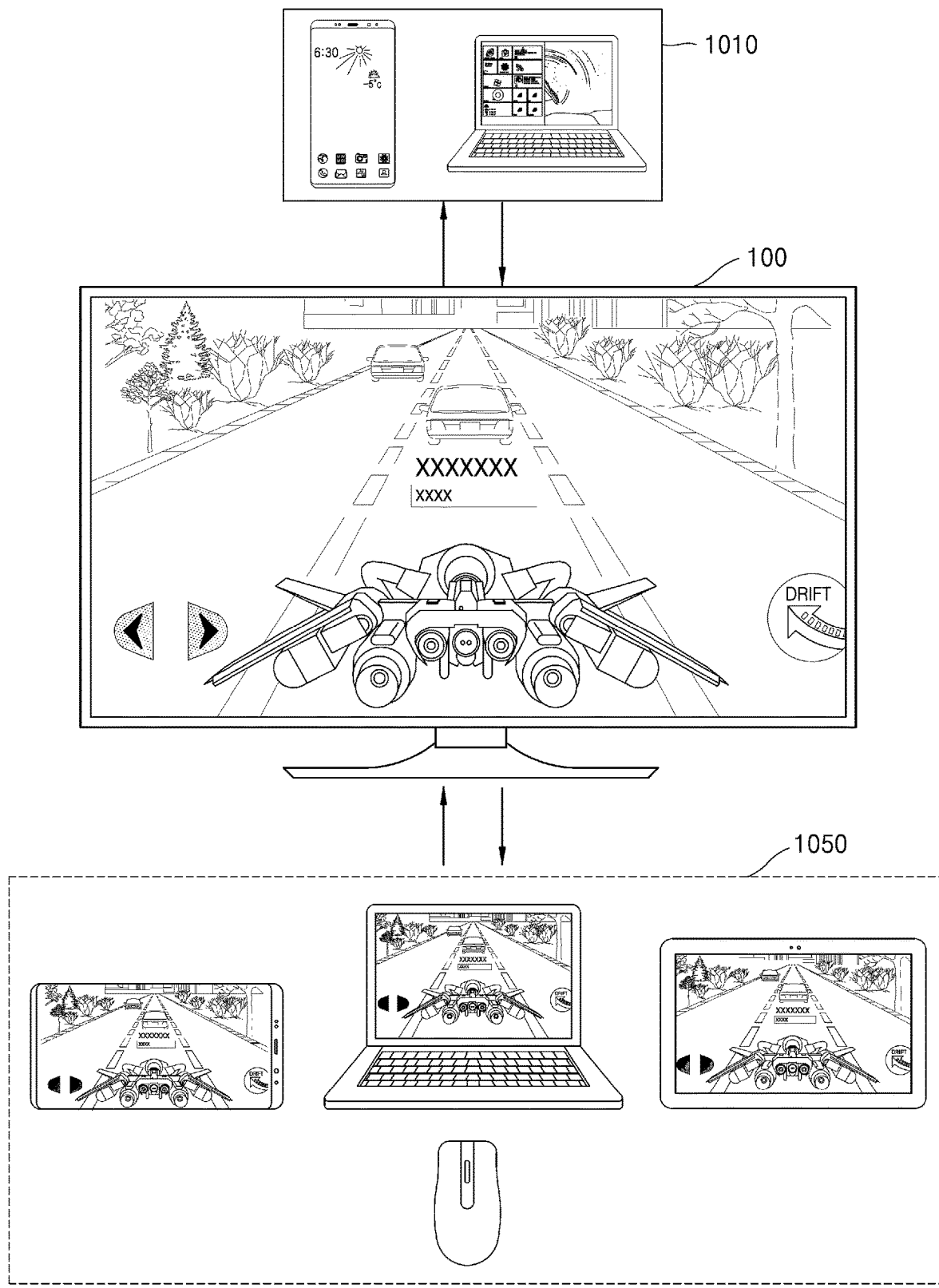

Referring to FIG. 10D, a control method of the first source device 1010 according to an embodiment may be a touch or pointing method, and a third input device 1050 paired (connected or matched) with the first source device 1010 may be a device including a touch screen or a pointing device (e.g., a mouse).

The display apparatus 100 may convert input data received from the third input device 1050 into coordinate values corresponding to the first source device 1010 and transmit the same to the first source device 1010.

For example, when an input of touching or pointing one point on the screen is received from the third input device 1050, the display apparatus 100 may convert coordinate values of the touched point into coordinate values on a screen of the first source device 1010, and transmit the coordinate values to the first source device 1010. The first source device 1010 may touch a corresponding point based on the received coordinate values, render an image in which the point has been touched, and transmit the image to the display apparatus 100.

Figure 11A:
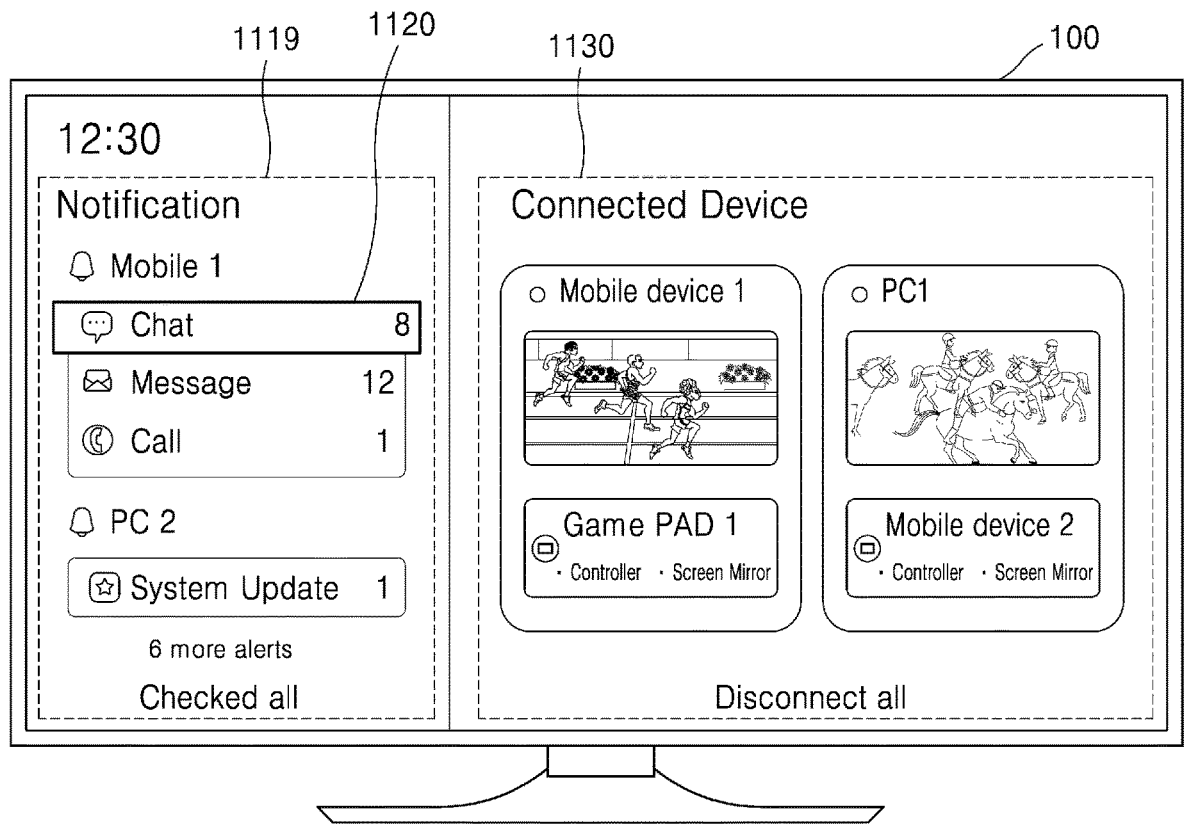
FIGS. 11A and 11B are diagrams illustrating an example in which a display apparatus displays notification information and connected device information, according to an embodiment.
Figure 11B:
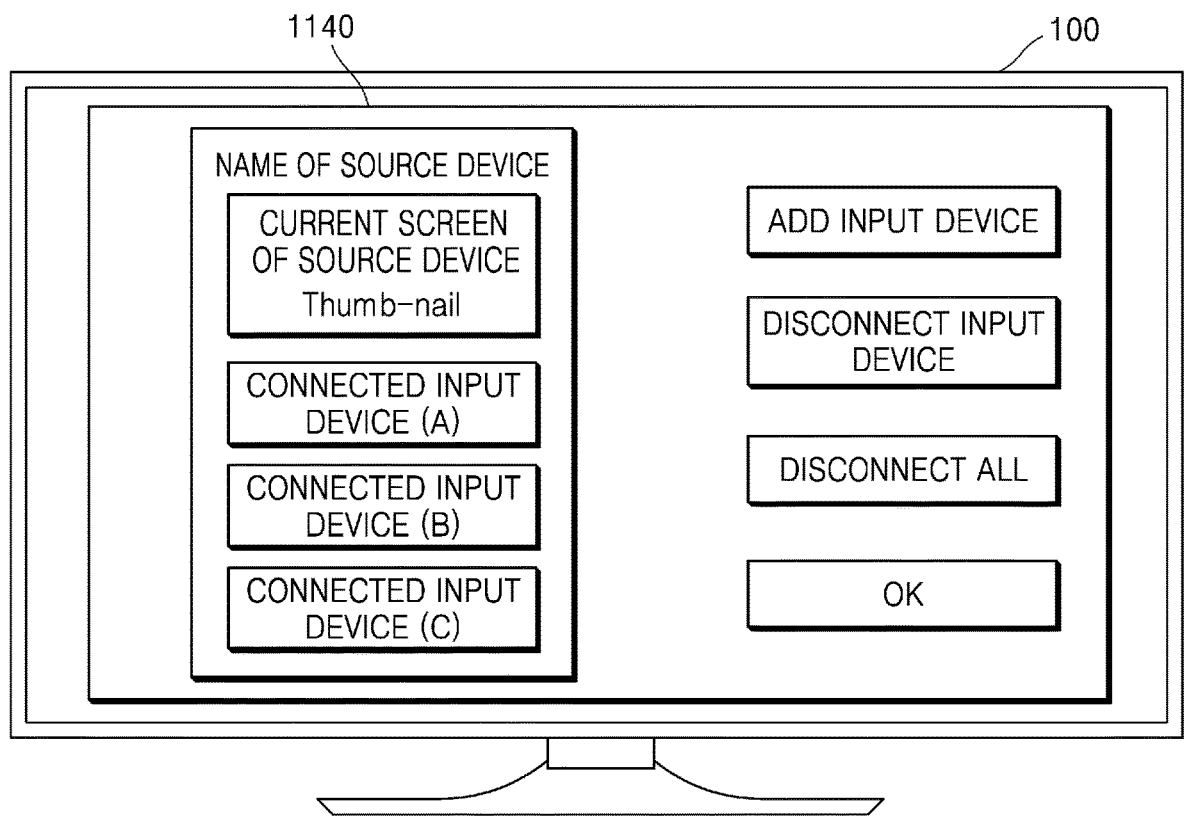

FIGS. 11A and 11B are diagrams illustrating an example in which a display apparatus displays notification information and connected device information, according to an embodiment.

Referring to FIG. 11A, the display apparatus 100 according to an embodiment may display notification information about source devices connected to the display apparatus 100. When first to third source devices are connected to the display apparatus 100, the display apparatus 100 may display a list screen 1119 including first notification information generated from the first source device, second notification information generated from the second source device, and third notification information generated from the third source device. In this case, the display apparatus 100 may display the notification information separately for each source device from which a notification is generated.

Also, when notification information is selected, the display apparatus 100 may display an application execution screen corresponding to the notification information.

For example, as shown in FIG. 11A, when a message notification 1120 generated from the first source device is displayed and an input of selecting a message notification is received from the first input device paired (connected or matched) with the first source device, the display apparatus 100 may transmit, to the first source device, an execution input of a message application corresponding to the message notification. The first source device may render a message application execution screen in which the message application is executed, and transmit the same to the display apparatus 100. The display apparatus 100 may display the message application execution screen.

Accordingly, a display apparatus user may easily check all pieces of notification information generated from the source devices by using the display apparatus 100 without having to check each of the source devices for the notification information generated from the source devices.

Also, the display apparatus 100 according to an embodiment may display connected device information 1130. The connected device information 1130 may include information about source devices connected to the display apparatus, information about input devices connected to the display apparatus, and pairing information between source devices and input devices.

When the first to third source devices are connected to the display apparatus 100, the display apparatus 100 may display items respectively indicating the first to third source devices. In this case, the items may display images or screens (e.g., a title image, a last execution screen, or the like) respectively corresponding to the source devices.

Also, when first to fourth input devices are connected to the display apparatus 100, the first input device is paired (connected or matched) with the first source device, the second input device is with the second source device, and the third and fourth input devices are paired (connected or matched) with the third source device, information about the first input device may be displayed in a first item indicating the first source device, information about the second input device may be displayed in a second item indicating the second source device, and information about the third and fourth input devices may be displayed in a third item indicating the third source device.

In addition, when an input of selecting one of items included in the connected device information is received, the display apparatus 100 may display a setting screen 1140 corresponding to the selected item, as shown in FIG. 11B.

Referring to FIG. 11B, the setting screen 1140 may include information about source devices, information about input devices paired (connected or matched) with source devices, an item to add an input device, an item to disconnect an input device, an item to disconnect all, or the like. When an input of selecting the item to add an input device is received, an additional input device to be paired (connected or matched) with a source device may be set, and when one of input devices included in the information about the input devices is selected and the item to disconnect an input device is selected, a paired (connected or matched) state of the selected input device may be released.

Also, when the item to disconnect all is selected, paired (connected or matched) states of all input devices paired (connected or matched) with source devices may be released.

Figure 12A:
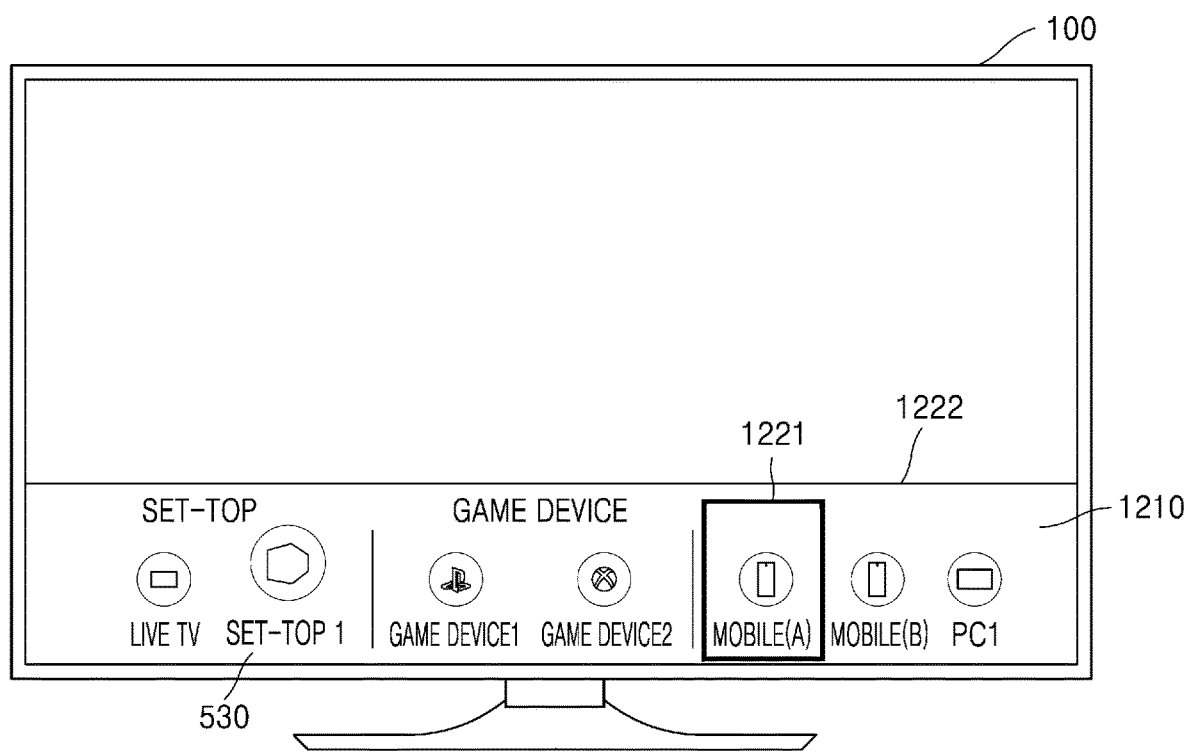
Figure 12C:
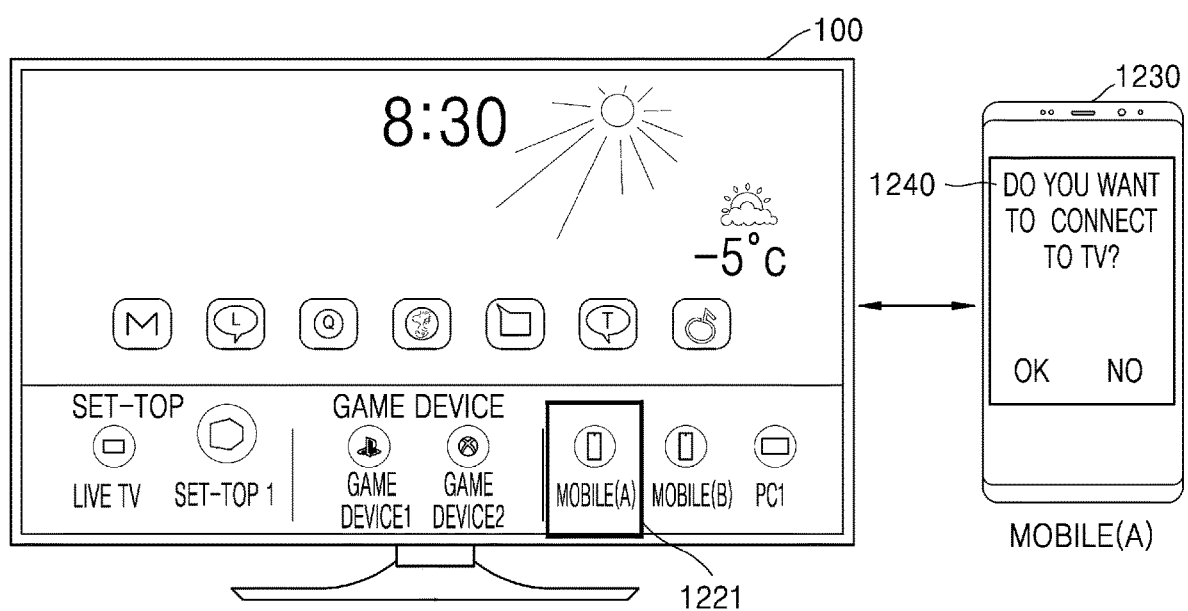

FIGS. 12A to 12C are diagrams illustrating a process of setting a source device as an input of a display apparatus according to locked states of source devices, according to an embodiment.

Referring to FIG. 12A, the display apparatus 100 may display a source device list 1210 including one or more source devices pre-registered in the display apparatus 100. In this case, among source devices connected to the display apparatus 100 through a wireless network, a source device connected to the same network as the display apparatus 100 may be displayed in an active state, and a source device connected to a different network may be displayed in an inactive state.

For example, when the display apparatus 100 is located in a house, a first item 1221 indicating a first mobile device located in the house and connected through a home network may be displayed in an active state, and a second item 1222 indicating a second mobile device located outside the house, such as at a workplace, and connected through a different network may be displayed in an inactive state. Accordingly, only source devices located in the house and connected through the home network may be set as inputs of the display apparatus 100. However, the disclosure is not limited thereto.

In addition, referring to FIG. 12B, when a first mobile device 1230 is in a locked state and an input of selecting the first item 1221 indicating the first mobile device 1230 from the source device list is received, the display apparatus 100 may display a password input screen. In this case, an image corresponding to the first mobile device 1230 may be displayed by inputting a password set when the first mobile device 1230 is first connected to the display apparatus 100. In this regard, the image corresponding to the first mobile device 1230 is an image that is rendered by the first mobile device 1230 and transmitted to the display apparatus 100.

In this case, the first mobile device 1230 may continue to maintain the locked state, and a display thereof may be turned off. The first mobile device 1230 may render the image in a background environment and transmit the image to the display apparatus 100.

Also, referring to FIG. 12C, when the first mobile device 1230 is in an unlocked state and the input of selecting the first item 1221 indicating the first mobile device 1230 from the source device list is received, the display apparatus 100 may transmit a connection request signal to the first mobile device 1230. In this case, the first mobile device 1230 may display a message 1240 asking whether to use the first mobile device 1230 as an input of the display apparatus 100. When an OK input is received, the display apparatus 100 may display the image corresponding to the first mobile device 1230.

Figure 13:
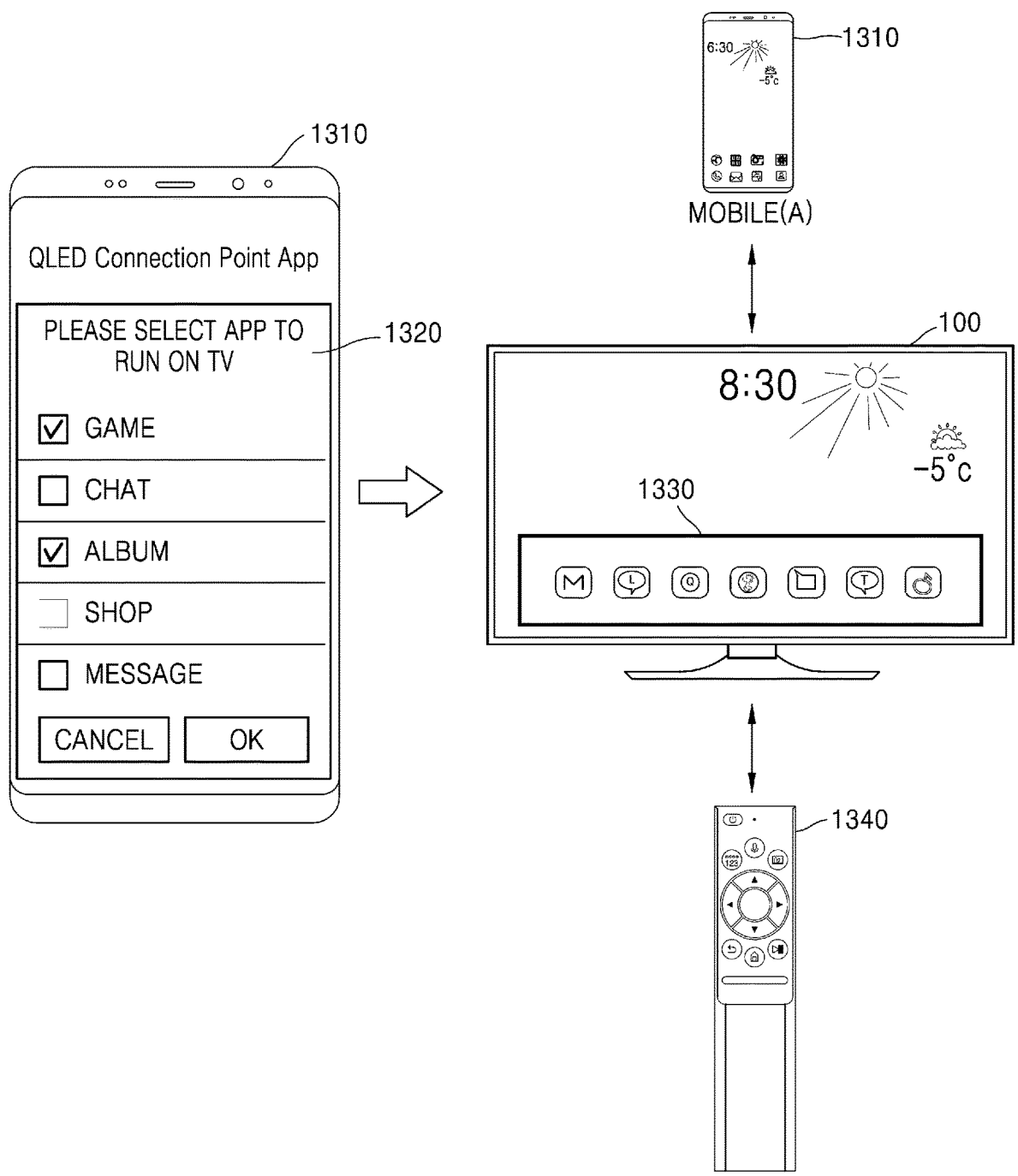
FIG. 13 is a diagram illustrating an operation of setting an application to be executed by using a display apparatus, according to an embodiment.

FIG. 13 is a diagram illustrating an operation of setting an application to be executed by using a display apparatus, according to an embodiment.

Referring to FIG. 13, when a source device 1310 is connected to the display apparatus 100 according to an embodiment, the source device 1310 may set an application to be executed on the display apparatus 100 among applications installed on the source device 1310. For example, the source device 1310 may display a first application list 1320 including applications installed on the source device 1310. In this case, an application that is not executable on the display apparatus 100 due to a policy or technology may be displayed in an inactive state.

The source device 1310 may set an application to be executed on the display apparatus 100 by receiving a user input of selecting an application. The source device 1310 may generate a second application list including a selected application, render a screen including the second application list, and transmit the screen to the display apparatus. Accordingly, the display apparatus may display a screen including a second application list 1330, and when the second application list 1330 is displayed, the display apparatus may receive an input of selecting one application included in the second application list 1330 from an input device 1340 paired with the source device 1310.

For example, the display apparatus 100 may place a focus on one of one or more applications included in the second application list 1330, receive an input of moving the focus from the input device 1340, and receive an input of selecting an application on which the focus is located.

The display apparatus 100 may convert input data received from the input device 1340 into input information corresponding to the source device 1310, and transmit the input information to the source device 1310. Accordingly, the source device 1310 may identify a selected application, and render an execution screen by executing the selected application. The rendered execution screen may be transmitted to the display apparatus 100, and the display apparatus 100 may display an application execution screen.

Figure 14:
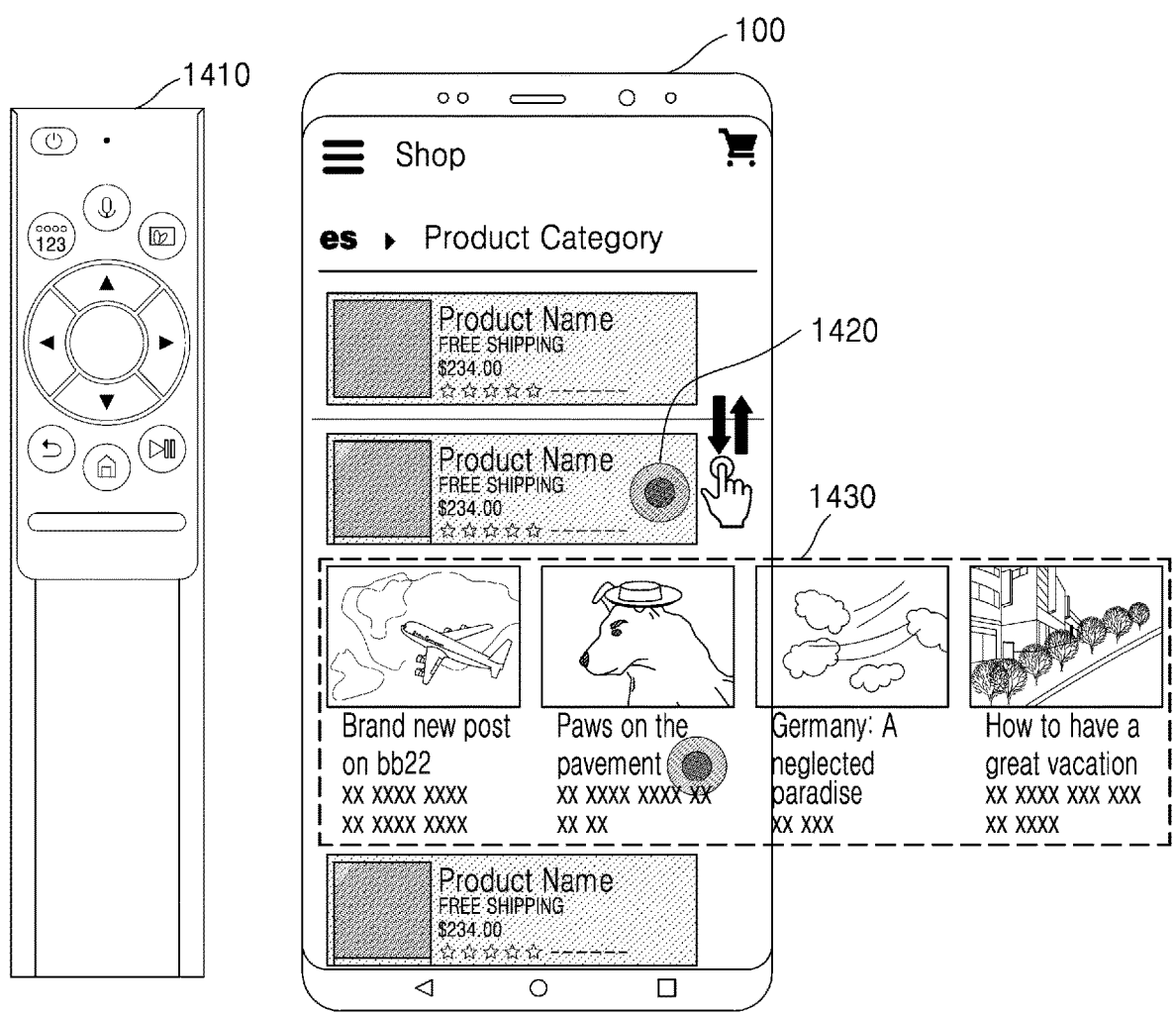
FIGS. 14 to 16 are diagrams referenced to describe a method of controlling a touch-type source device by using an input device, according to an embodiment.
Figure 15:
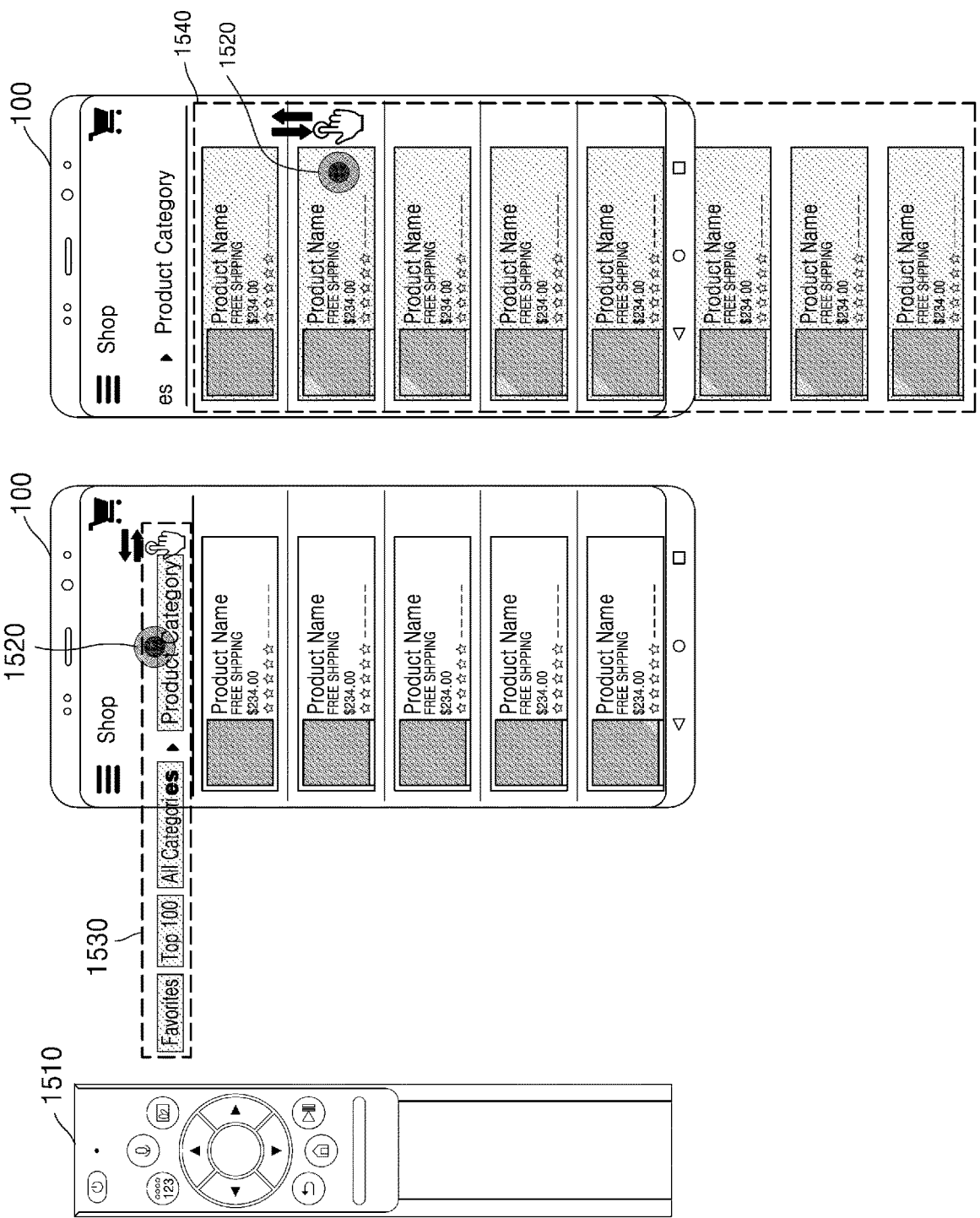
Figure 16:
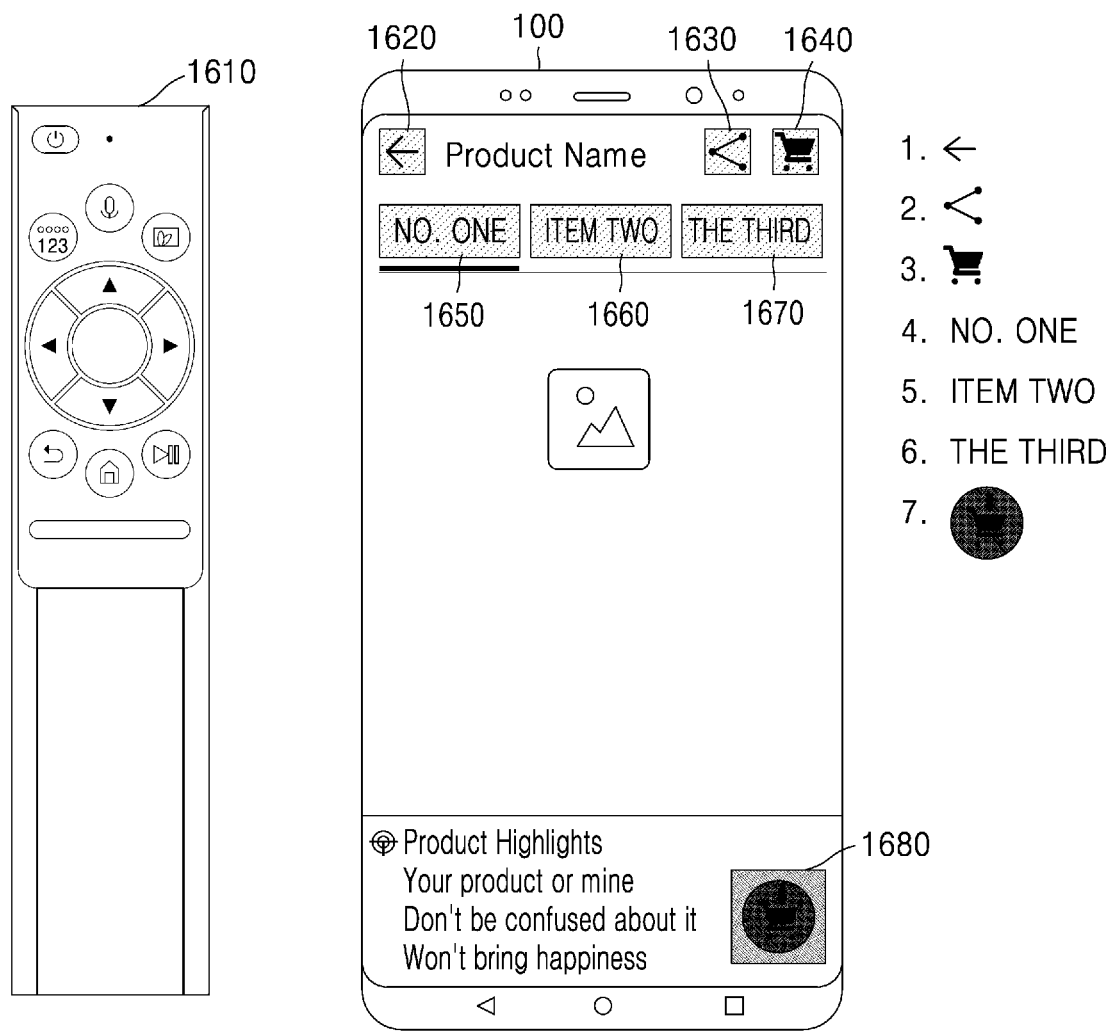

FIGS. 14 to 16 are diagrams referenced to describe a method of controlling a touch-type source device by using an input device, according to an embodiment.

Referring to FIG. 14, the display apparatus 100 according to an embodiment may display an image received from a touch-type source device, and display a cursor or pointer 1420. An input device 1410 according to an embodiment may be a remote controller including four direction keys. When an input of pressing once or holding down one of the four direction keys is received from the input device 1410, the display apparatus 100 may move the cursor or pointer in a corresponding direction.

In addition, when the cursor or pointer 1420 is located in a horizontally scrollable item list area 1430, the display apparatus 100 may receive, from the input device 1410, an input of pressing twice or holding down a right arrow key. When the input is received, the display apparatus 100 may convert the input data received from the input device 1410, such that a motion of scrolling to the right occurs by touching a corresponding area.

The display apparatus 100 may transmit the converted input data to a source device, and the source device may scroll to the right based on the converted input data. Also, the source device may render a screen to which a scroll motion is applied, and transmit the screen to the display apparatus 100.

Referring to FIG. 15, the display apparatus 100 according to an embodiment may analyze a layout structure of the image received from the source device, identify an object on which a cursor or pointer is located, and identify objects having the same structure as the object. The display apparatus 100 may convert a key or button input included in an input device 1510 into another input according to circumstances, based on a result of the analysis and identification.

For example, as shown in FIG. 15, when cursor or pointer 1520 is located on a horizontal scroll layout 1530, the display apparatus 100 may convert the input data received from the input device 1510, such that a motion of scrolling to the right occurs when an input of a down arrow key or a right arrow key included in the input device is received. Alternatively, the display apparatus 100 may convert the input data received from the input device 1510, such that a motion of scrolling to the left occurs when an input of an up arrow key or a left arrow key is received.

The display apparatus 100 may transmit the converted input data to the source device, and the source device may scroll to the right or to the left based on the converted input data. Also, the source device may render a screen to which a motion of scrolling to the right or a motion of scrolling to the left is applied, and transmit the screen to the display apparatus 100.

Alternatively, when the cursor or pointer 1520 is located on a vertical scroll layout 1540, the display apparatus 100 may convert the input data received from the input device 1510, such that a motion of scrolling down occurs when an input of a down arrow key or a right arrow key included in the input device 1510 is received. Alternatively, the display apparatus 100 may convert the input data received from the input device 1510, such that a motion of scrolling up occurs when an input of an up arrow key or a left arrow key is received.

The display apparatus 100 may transmit the converted input data to the source device, and the source device may scroll down or up based on the converted input data. Also, the source device may render a screen to which a motion of scrolling down or a motion of scrolling up is applied, and transmit the screen to the display apparatus 100.

Referring to FIG. 16, the display apparatus 100 according to an embodiment may analyze a layout structure of an image (screen) received from the source device, identify objects to which events (e.g., a touch event, etc.) are registered among objects included in the image, and determine the order of objects based on locations of the identified objects.

For example, as shown in FIG. 16, a first object 1620, a second object 1630, a third object 1640, a fourth object 1650, a fifth object 1660, a sixth object 1670, and a seventh object 1680 included in a screen are objects set to perform a preset operation according to a touch input. The display apparatus 100 may determine the order based on locations of the first to seventh objects. For example, the order of objects may be determined from top to bottom and from left to right. Accordingly, the first object 1620 may be determined as number 1, the second object 1630 may be determined as number 2, the third object 1640 may be determined as number 3, the fourth object 1650 may be determined as number 4, the fifth object 1660 may be determined as number 5, the sixth object 1670 may be determined as number 6, and the seventh object 1680 may be determined as number 7.

For example, in a state in which a focus is located on the third object 1640 on the screen, the display apparatus 100 may convert the input data, such that a motion of moving the focus to the fourth object 1650, which is a next order of the third object, occurs when an input of a right arrow key included in an input device 1610 is received. Alternatively, the display apparatus 100 may convert the input data, such that a motion of moving the focus to the second object 1630, which is a previous order of the third object 1640, occurs when an input of a left arrow key included in the input device 1610 is received.

Alternatively, in a state in which the focus is located on the fourth object 1650 on the screen, the display apparatus 100 may convert the input data, such that a motion of moving the focus to the seventh object 1680, which is located below the fourth object 1650, occurs when an input of a down arrow key included in the input device 1610 is received. Alternatively, the display apparatus 100 may convert the input data, such that a motion of moving the focus to the first object 1620, which is located above the fourth object 1650, occurs when an input of an up arrow key included in the input device is received.

The display apparatus 100 may transmit the converted input data to the source device, and the source device may move the focus based on the converted input data. Also, the source device may render a screen on which the focus is moved, and transmit the screen to the display apparatus.

Figure 17:
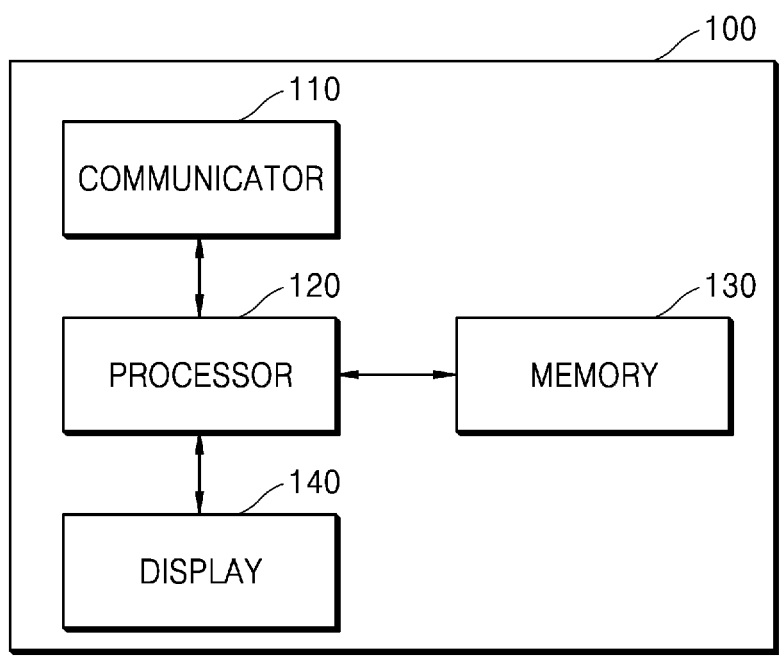
FIG. 17 is a block diagram of a configuration of a display apparatus according to an embodiment.

FIG. 17 is a block diagram of a configuration of a display apparatus according to an embodiment.

Referring to FIG. 17, the display apparatus 100 according to an embodiment may include a communicator 110, a processor 120, a memory 130, and a display 140.

The communicator 110 according to an embodiment may transmit or receive data or signals to or from an external device or an external server under control by the processor 120. The communicator 110 according to an embodiment may communicate with source devices and input devices by using at least one wired or wireless communication network.

The communicator 110 may transmit or receive data or signals by using at least one of methods such as a WLAN, for example, Wi-Fi, BT, wired Ethernet, infrared (IR), BLE, ultrasound, and Zigbee. In this case, the communicator 110 may include at least one of communication modules capable of transmitting or receiving data according to a communication protocol corresponding to the aforementioned WLAN, for example, Wi-Fi, BT, wired Ethernet, IR, BLE, ultrasound, and Zigbee.

The communicator 110 according to an embodiment may search for a peripheral device (source device or input device) by using Wi-Fi communication and BT or BLE communication.

Also, the communicator 110 may receive an image or speech from a source device connected to the display apparatus 100 and receive input data from an input device, under the control by the processor 120.

The processor 120 according to an embodiment may execute one or more programs stored in the memory 130. The processor 120 may include a single core, a dual core, a triple core, a quadruple core, and a core of a multiple thereof. Also, the processor 120 may include a plurality of processors.

The memory 130 according to an embodiment may store various types of data, programs, or applications for driving and controlling the display apparatus 100.

Furthermore, a program stored in the memory 130 may include one or more instructions. The program (one or more instructions) or applications stored in the memory 130 may be executed by the processor 120.

The processor 120 according to an embodiment may control source devices and input devices, which are connected to the display apparatus 100, to be paired (connected or matched) with each other. When an image is received from a source device, the processor 120 may route the image to an input device paired (connected or matched) with the source device.

Also, when input data is received from the input device, the processor 120 may convert the input data into input information corresponding to the source device paired (connected or matched) with the input device, and route the input information to the source device.

The processor 120 may map an input for each of one or more objects included in an image received from a first source device to an input for each of one or more buttons or keys included in a first input device, and convert input data into input information based on mapping information. Alternatively, the processor 120 may convert input data into input information based on layout information about the image received from the first source device. However, the disclosure is not limited thereto.

According to an embodiment, the display 140 generates a driving signal by converting an image signal, a data signal, an on-screen display (OSD) signal, a control signal, or the like processed by the processor 120. The display 140 may be implemented as a plasma display panel (PDP), a liquid crystal display (LCD), an organic light-emitting diode (OLED) display, a flexible display, or the like, and may also be implemented as a three-dimensional (3D) display. Furthermore, the display 140 may be configured as a touch screen to be used as an input device other than an output device.

The display 140 according to an embodiment may receive an image from a source device currently set as an input of the display apparatus 100, and display the image.

Figure 18:
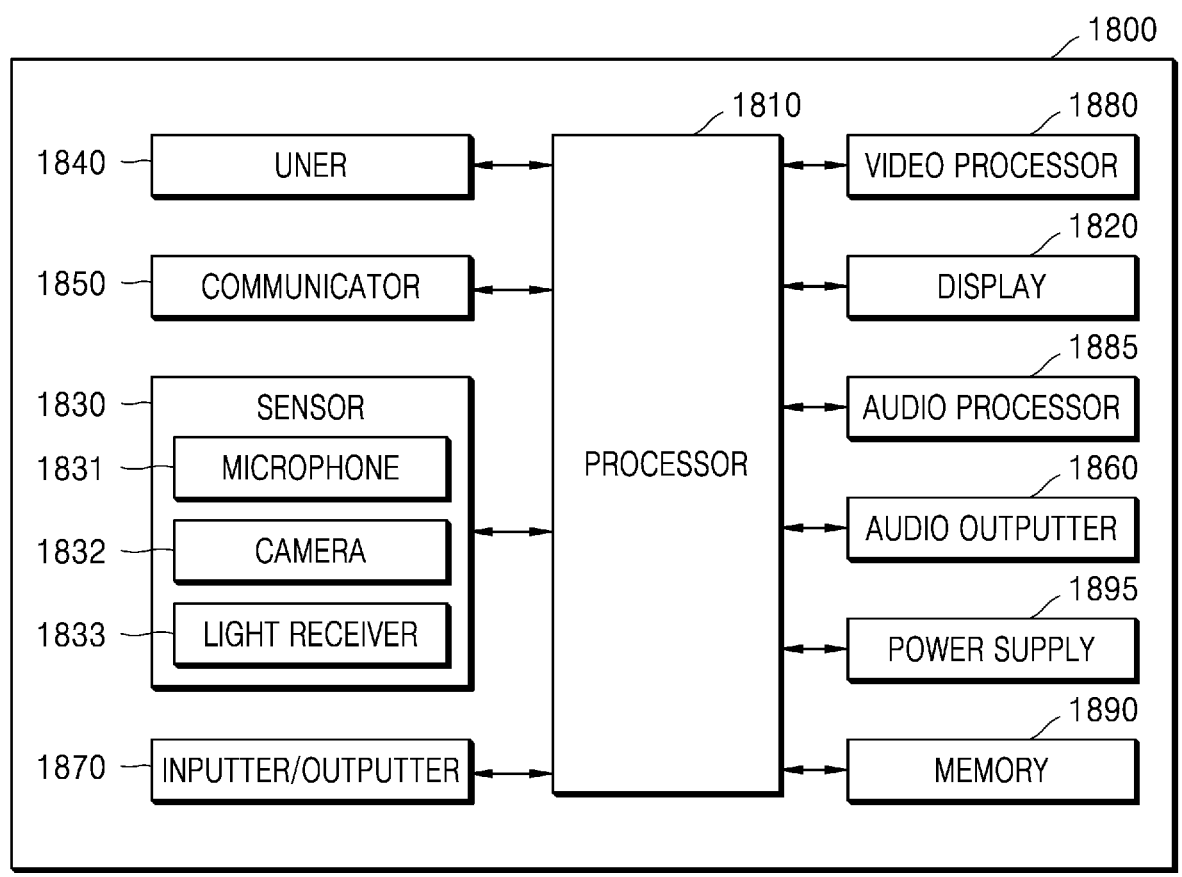
FIG. 18 is a block diagram of a configuration of a display apparatus according to another embodiment.

FIG. 18 is a block diagram of a configuration of a display apparatus 1800 according to another embodiment.

Referring to FIG. 18, the display apparatus 1800 of FIG. 18 may be an embodiment of the display apparatus 100 described above with reference to FIGS. 1 to 17.

Referring to FIG. 18, the display apparatus 1800 according to an embodiment may include a tuner 1840, a processor 1810, a display 1820, a communicator 1850, a sensor 1830, an inputter/outputter 1870, a video processor 1880, an audio processor 1885, an audio outputter 1860, a memory 1890, and a power supply 1895.

The communicator 1850 of FIG. 18 is a component corresponding to the communicator 110 of FIG. 17, the processor 1810 of FIG. 18 is a component corresponding to the processor 120 of FIG. 17, the memory 1890 of FIG. 18 is a component corresponding to the memory 130 of FIG. 17, and the display 1820 of FIG. 18 is a component corresponding to the display 140 of FIG. 17. Therefore, the same description, which is already provided above, will be omitted.

The tuner 1840 according to an embodiment may tune and select only a frequency of a channel that the display apparatus 1800 is to receive, from among a large number of radio wave components, by performing amplification, mixing, resonance, etc. on a broadcast signal received in a wired or wireless manner. The broadcast signal includes audio, video, and additional information (e.g., electronic program guide (EPG)).

The tuner 1840 may receive broadcast signals from various sources, such as a terrestrial broadcast, a cable broadcast, a satellite broadcast, an Internet broadcast, and the like. The tuner 1840 may receive a broadcast signal from a source, such as an analog broadcast or a digital broadcast.

The sensor 1830 may detect a speech, image, or interaction of a user, and include a microphone 1831, a camera 1832, and a light receiver 1833.

The microphone 1831 receives a speech uttered by the user. The microphone 1831 may convert the received speech into an electrical signal and output the electrical signal to the processor 1810. The speech of the user may include, for example, a speech corresponding to a menu or function of the display apparatus 1800.

The camera 1832 may receive an image (e.g., consecutive image frames) corresponding to a motion of the user including a gesture in a range recognizable by a camera. The processor 1810 may select a menu displayed on the display apparatus 1800 by using a received motion recognition result, or perform a control operation corresponding to the motion recognition result.

The light receiver 1833 receives an optical signal (including a control signal) from an external control device through an optical window of a bezel of the display 1820 or the like. The light receiver 1833 may receive an optical signal corresponding to a user input (e.g., a touch, a press, a touch gesture, a speech, or a motion) from the control device. A control signal may be extracted from the received optical signal under the control by the processor 1810.

The inputter/outputter 1870 may receive a video (e.g., a moving image, etc.), audio (e.g., a speech, music, etc.) and additional information (e.g., EPG, etc.) from outside the display apparatus 1800. The inputter/outputter 1870 may include at least one of an HDMI port, a mobile high-definition link (MHL) port, a USB port, a display port (DP), a thunderbolt port, a video graphics array (VGA) port, a red-green-blue (RGB) port, a D-subminiature (D-SUB) port, a digital visual interface (DVI) port, a component jack, and a PC port.

The processor 1810 controls overall operations of the display apparatus 1800 and the flow of signals between internal components of the display apparatus 1800, and processes data. The processor 1810 may execute an operation system (OS) and various applications stored in the memory 1890 when there is a user input or a preset and stored condition is satisfied.

The processor 1810 may include random access memory (RAM) storing signals or data input from outside the display apparatus 1800, or used as a storage area corresponding to various operations performed in the display apparatus 1800, read-only memory (ROM) storing a control program for controlling the display apparatus 1800, and a processor.

The video processor 1880 processes video data received by the display apparatus 1800. The video processor 1880 may perform various types of image processing, such as decoding, scaling, noise cancellation, frame rate conversion, resolution conversion, and the like, on video data.

The display 1820 generates a driving signal by converting an image signal, a data signal, an OSD signal, a control signal, or the like processed by the processor 1810. The display 1820 may be implemented as a PDP, an LCD, an OLED display, a flexible display, or the like, and may also be implemented as a 3D display. Furthermore, the display 1820 may be configured as a touch screen to be used as an input device other than an output device.

The audio processor 1885 processes audio data. The audio processor 1885 may perform various types of processing, for example, decoding, amplification, noise cancellation, and the like, on the audio data. In addition, the audio processor 1885 may include a plurality of audio processing modules to process audio data corresponding to a plurality of pieces of content.

The audio outputter 1860 outputs audio data included in a broadcast signal received through the tuner 1840, under the control by the processor 1810. The audio outputter 1860 may output audio data (e.g., a speech or sound) input through the communicator 1850 or the inputter/outputter 1870. In addition, the audio outputter 1860 may output audio data stored in the memory 1890, under the control by the processor 1810. The audio outputter 1860 may include at least one of a speaker, a headphone output port, or a Sony/Philips digital interface (S/PDIF) output port.

The power supply 1895 supplies power from an external power source to the internal components of the display apparatus 1800 under the control by the processor 1810. The power supply 1895 may supply power output from one or more batteries provided in the display apparatus 1800, to the internal components under the control by the processor 1810.

The memory 1890 may store various types of data, programs, or applications for driving and controlling the display apparatus 1800, under the control by the processor 1810. Although not shown, the memory 1890 may include a broadcast reception module, a channel control module, a volume control module, a communication control module, a speech recognition module, a motion recognition module, an optical reception module, a display control module, an audio control module, an external input control module, a power control module, a power control module of an external device connected in a wireless manner (e.g., BT), a speech database (DB), or a motion DB. The modules and DBs of the memory 1890, which are not shown, may be implemented in the form of software in the display apparatus 1800 to perform a broadcast reception control function, a channel control function, a volume control function, a communication control function, a speech recognition function, a motion recognition function, an optical reception control function, a display control function, an audio control function, an external input control function, a power control function, or a power control function of an external device connected in a wireless manner (e.g., BT). The processor 1810 may perform respective functions by using the software stored in the memory 1890.

The block diagrams of the display apparatuses 100 and 1800 shown in FIGS. 17 and 18 are for an embodiment. Each of the components of the block diagrams may be integrated, added, or omitted according to the specifications of the display apparatuses 100 and 1800 that are actually implemented. That is, two or more components may be combined into one component, or one component may be subdivided into two or more components as needed. In addition, functions performed by each block are for explaining embodiments, and specific operations or devices thereof do not limit the scope of the disclosure.

The operating method of the display apparatus according to the embodiment may be embodied as program commands executable by various computer means and may be recorded on a computer-readable recording medium. The computer-readable recording medium may include program commands, a data file, a data structure, etc. alone or in combination. The program commands written to the computer-readable recording medium may be specifically designed and configured for the disclosure or may be well-known and available to one of ordinary skill in the art. Examples of the computer-readable recording medium may include magnetic media such as hard disks, floppy disks, and magnetic tapes, optical media such as compact disk read-only memory (CD-ROM) and digital versatile disks (DVDs), magneto-optical media such as optical disks, and hardware devices especially configured to store and execute program commands, such as read-only memory (ROM), random access memory (RAM) and flash memory, etc. Examples of the program commands include advanced language code that can be executed by a computer by using an interpreter or the like as well as machine language code made by a compiler.

Also, the display apparatus and the operating method therefor according to the disclosed embodiments may be included in a computer program product and provided in that form. The computer program product may be traded as a product between a seller and a buyer.

The computer program product may include an S/W program or a computer-readable storage medium storing the S/W program. For example, the computer program product may include an S/W program product (e.g., a downloadable application) electronically distributed through a manufacturing company of an electronic apparatus or an electronic market (e.g., Google Play Store or App Store). For electronic distribution, at least a part of the S/W program may be stored in a storage medium or may be temporarily generated. In this case, the storage medium may be a storage medium of a server of a manufacturer, a server of an electronic market, or a relay server that temporarily stores the S/W program.

The computer program product may include, in a system including a server and a client device, a storage medium of the server or a storage medium of the client device. Alternatively, when there is a third device (e.g., a smartphone) connected through communication with the server or client server, the computer program product may include a storage medium of the third device. Alternatively, the computer program product may include an S/W program itself, which is transmitted from the server to the client device or the third device, or transmitted from the third device to the client device.

In this case, one of the server, the client device, and the third device may execute a method according to disclosed embodiments by executing the computer program product. Alternatively, at least two of the server, the client device, and the third device may execute the method according to disclosed embodiments in a distributed fashion by executing the computer program product.

For example, the server (e.g., a cloud server or an AI server) may execute the computer program product stored in the server and may control the client device communicating with the server to perform the method according to disclosed embodiments.

While the embodiments have been described in detail, the scope of the disclosure is not limited thereto, and it will be understood by those of ordinary skill in the art that various changes in form and details may be made therein without departing from the spirit and scope as defined by the following claims.

What is claimed is:

1. A display apparatus comprising:
a display;
a communicator;
a memory configured to store at least one instruction; and
a processor operatively connected to the memory and configured to execute the at least one instruction to:
control the communicator to connect a plurality of source devices including a first source device and a second source device and a plurality of input devices including a first input device and a second input device to the display apparatus;
connect the first source device with the first input device and connect the second source device with the second input device;
control the display to display an image received from the first source device or the second source device;
based on a first input data being received from the first input device, control the communicator to transmit, to the first source device, first input information corresponding to the first source device based on the first input data; and
based on a second input data being received from the second input device, control the communicator to transmit, to the second source device, second input information corresponding to the second source device based on the second input data,
wherein the second input device is different from the first input device.

2. The display apparatus of claim 1, wherein the processor is further configured to execute the at least one instruction to control the communicator to connect the plurality of source devices and the plurality of input devices to the display apparatus by using at least one of Bluetooth, Wi-Fi, a high-definition multimedia interface (HDMI), or a universal serial bus (USB).

3. The display apparatus of claim 1, wherein the processor is further configured to execute the at least one instruction to control the communicator to transmit, to the first input device, the image received from the first source device.

4. The display apparatus of claim 1, wherein the processor is further configured to execute the at least one instruction to:
connect the first source device with the second input device among the plurality of input devices; and
based on the second input data being received from the second input device, control the communicator to control the first source device.

5. The display apparatus of claim 1, wherein the processor is further configured to execute the at least one instruction to:
connect the second source device among the plurality of source devices with a third input device among the plurality of input devices; and
control the communicator to control the second source device based on a third input data received from the third input device.

6. The display apparatus of claim 5, wherein the processor is further configured to execute the at least one instruction to:
based on an input to the display apparatus is indicating a switching from the first source device to the second source device, control the display to display an image received from the second source device; and
control the communicator to maintain a connected state between the first source device and the first input device.

7. The display apparatus of claim 1, wherein the processor is further configured to execute the at least one instruction to:
based on a connection request between the second source device among the plurality of source devices and the first input device being received, disconnect the first source device and the first input device from the display apparatus, and connect the second source device with the first input device.

8. The display apparatus of claim 1, wherein the processor is further configured to execute the at least one instruction to:
  convert the first input data received from the first input device into input information corresponding to the first source device; and
  control the communicator to transmit the input information to the first source device.

9. The display apparatus of claim 8, wherein the processor is further configured to execute the at least one instruction to:
  map at least one object of the image received from the first source device to at least one button or key of the first input device, and
  convert the first input data into the input information based on the mapping of the at least one object of the image to the at least one button or key.

10. The display apparatus of claim 8, wherein the processor is further configured to execute the at least one instruction to convert the first input data into the input information based on layout information about the image received from the first source device.

11. The display apparatus of claim 1, wherein the processor is further configured to execute the at least one instruction to:
  based on the first source device being in a locked state, control the display to display a screen requesting a password; and
  based on the password being received from the first input device, display the image received from the first source device.

12. An operating method of a display apparatus, the operating method comprising:
  connecting a plurality of source devices including a first source device and a second source device to the display apparatus and a plurality of input devices including a first input device and a second input device to the display apparatus;
  connecting the first source device with the first input device and connect the second source device with the second input device;
  displaying an image received from the first source device or the second source device;
  receiving a first input data from the first input device and receiving a second input data from the second input device;
  controlling the first source device based on the first input data; and
  controlling the second source device based on the second input data,
  wherein the second input device is different from the first input device.

13. The operating method of claim 12, wherein the connecting the plurality of source devices to the display apparatus and the plurality of input devices to the display apparatus comprises connecting the plurality of source devices to the display apparatus and the plurality of input devices to the display apparatus by using at least one of Bluetooth, Wi-Fi, a high-definition multimedia interface (HDMI), and a universal serial bus (USB).

14. A non-transitory computer-readable recording medium storing therein a program that is executable by a process of a computer to perform the operating method of claim 12.

* * * * *